United States Patent
Dietz et al.

(10) Patent No.: US 9,776,909 B2
(45) Date of Patent: Oct. 3, 2017

(54) GLASS FRIT

(71) Applicant: NAMICS CORPORATION, Niigata-shi, Niigata (JP)

(72) Inventors: Raymond Dietz, Byfield, MA (US); Maciej Patelka, Byfield, MA (US); Noriyuki Sakai, Niigata (JP); Hiroshi Yamaguchi, Niigata (JP)

(73) Assignee: NAMICS CORPORATION, Niigata (JP)

( * ) Notice: Subject to any disclaimer, the term of this patent is extended or adjusted under 35 U.S.C. 154(b) by 171 days.

(21) Appl. No.: 14/763,415

(22) PCT Filed: Jan. 28, 2014

(86) PCT No.: PCT/JP2014/051854
§ 371 (c)(1),
(2) Date: Nov. 6, 2015

(87) PCT Pub. No.: WO2014/119579
PCT Pub. Date: Aug. 7, 2014

(65) Prior Publication Data
US 2016/0052820 A1    Feb. 25, 2016

Related U.S. Application Data

(60) Provisional application No. 61/759,630, filed on Feb. 1, 2013.

(51) Int. Cl.
| | |
|---|---|
| *C03C 8/02* | (2006.01) |
| *C03C 3/12* | (2006.01) |
| *C03C 8/04* | (2006.01) |
| *C03C 8/08* | (2006.01) |
| *C03C 3/062* | (2006.01) |
| *C03C 3/16* | (2006.01) |
| *C03C 8/14* | (2006.01) |

(52) U.S. Cl.
CPC ............... *C03C 8/02* (2013.01); *C03C 3/062* (2013.01); *C03C 3/122* (2013.01); *C03C 3/16* (2013.01); *C03C 8/04* (2013.01); *C03C 8/08* (2013.01); *C03C 8/14* (2013.01)

(58) Field of Classification Search
CPC .... C03C 8/02; C03C 8/04; C03C 8/08; C03C 8/14; C03C 3/122; C03C 3/16; C03C 3/062

See application file for complete search history.

(56) References Cited

U.S. PATENT DOCUMENTS

| | | | |
|---|---|---|---|
| 3,755,065 | A | 8/1973 | Chvatal |
| 3,798,114 | A | 3/1974 | Chvatal |
| 5,334,558 | A | 8/1994 | Dietz et al. |
| 5,543,366 | A | 8/1996 | Dietz et al. |
| 2006/0290261 | A1 | 12/2006 | Sawai et al. |
| 2014/0145122 | A1 | 5/2014 | Sawai et al. |

FOREIGN PATENT DOCUMENTS

| | | | | |
|---|---|---|---|---|
| JP | 49010913 | A | 1/1974 | |
| JP | 51138711 | A | 11/1976 | |
| JP | 05147974 | A | 6/1993 | |
| JP | 08502468 | A | 3/1996 | |
| JP | 08259262 | A | 10/1996 | |
| JP | 2007022853 | A | 2/2007 | |
| JP | 2013103840 | A | 5/2013 | |
| JP | 5826178 | B2 * | 12/2015 | ............... C03C 8/08 |
| WO | 2012020694 | A1 | 2/2012 | |
| WO | 2013005600 | A1 | 1/2013 | |

OTHER PUBLICATIONS

Machine Translation of JP 8-259262 A, Oct. 8, 1996.*
Machine Translation of JP 2013-103840 A, May 30, 2013.*
Extended European Search Report dated Jul. 27, 2016, issued in counterpart European Application No. 14745582.8.
International Search Report (ISR) dated Apr. 22, 2014 issued in International Application No. PCT/JP2014/051854.

* cited by examiner

*Primary Examiner* — Elizabeth A Bolden

(74) *Attorney, Agent, or Firm* — Holtz, Holtz & Volek PC

(57) ABSTRACT

A glass frit having a low melting point containing (A) $Ag_2O$, (B) $V_2O_5$, and (C) at least one first oxide selected from the group consisting of $MoO_3$, ZnO, CuO, $TiO_2$, $Bi_2O_3$, $MnO_2$, MgO, $Nb_2O_5$, BaO and $P_2O_5$. The glass frit preferably contains 40 to 70% by mass of (A), 10 to 40% by mass of (B), and 0.5 to 30% by mass of (C) with respect to the total mass in terms of oxides. Furthermore, the glass frit preferably has a mass ratio ($Ag_2O/V_2O_5$) of (A) to (B) of 1.8 to 3.2.

21 Claims, No Drawings

GLASS FRIT

CROSS REFERENCE TO RELATED APPLICATIONS

This application is the United States national application under 35 USC 371 of International application Serial No. PCT/JP 2014/051854 filed on Jan. 1, 2013, which claims the benefit under 35 USC 119(e) of U.S. provisional application Ser. No. 61/759,630 filed on Feb. 1, 2013.

TECHNICAL FIELD

The present invention relates to a glass frit having a low melting point and not containing toxic substances such as lead, arsenic, antimony, and tellurium.

BACKGROUND ART

Glass frit is used in die attach materials for bonding a semiconductor device such as a silicon carbide (SiC) chip to a substrate or for electrically conductive pastes for forming electrodes. Furthermore, glass frit is used in sealing materials for electronic components, such as ceramic packages for housing integrated circuit devices, and display devices. Considering the properties of adherends that are significantly sensitive to heat, die attach materials, electrically conductive pastes, or sealing materials that exhibit adhesion at relatively low temperatures have been demanded. For such a die attach material, electrically conductive paste, or sealing material that exhibits adhesion at relatively low temperatures, a composition containing a low-melting-point glass is used.

PbO—$B_2O_3$-based low-melting-point glasses have been conventionally known as low-melting-point glasses. Patent Document 1 discloses, as a glass having a low softening point, a glass containing: 20 to 70% silver oxide, 10 to 70% of an oxide of vanadium or molybdenum, and 10 to 70% of an oxide of metalloid selected from the group consisting of phosphorus, germanium, arsenic, antimony, bismuth, and tellurium (Patent Document 1).

Patent Document 2 discloses, as a glass that can be sintered at a lower temperature than that for conventional PbO—$B_2O_3$-based low-melting-point glasses, a low-melting-point glass containing: 8 to 20% $Ag_2O$, 20 to 35% $MoO_3$, 1 to 6% ZnO, 30 to 55% $TeO_2$, and 5 to 19% $V_2O_5$ (Patent Document 2).

Furthermore, as a glass used in die attach materials and the like, for example, a glass that forms a $Ag_2O$—$V_2O_5$—$TeO_2$—$PbO_2$ crystal, where the glass contains: approximately 40 to 65% $Ag_2O$, approximately 15 to 35% $V_2O_5$, approximately 0 to 50% of at least one oxide selected from the group consisting of $TeO_2$, $PbO_2$, and $Pb_3O_4$, in terms of mass ratio based on oxides, has been disclosed (e.g., Patent Document 3). The glass disclosed in Patent Document 3 is, for example, used in a paste for adhering a temperature sensitive device at a low temperature (e.g., 350° C.) in a ceramic package for housing a temperature sensitive integrated circuit device.

PRIOR ART DOCUMENTS

Patent Document

Patent Document 1: Japanese Unexamined Patent Publication No. Sho 51-138711
Patent Document 2: Japanese Unexamined Patent Publication No. Hei 08-259262 (unexamined, published Japanese patent application)
Patent Document 3: Japanese Patent Kohyo Publication No. Hei 08-502468

SUMMARY OF THE INVENTION

Problems to be Solved by the Invention

However, PbO—$B_2O_3$-based low-melting-point glasses and the low-melting-point glasses disclosed in Patent Documents 1 to 3 often contain toxic substances such as lead (Pb), arsenic (As), antimony (Sb), and tellurium (Te). Due to the growing concerns on the environment in recent years, use of a glass that is free of toxic substances in die attach materials, electrically conductive pastes, or sealing materials has been desired. Furthermore, for die attach materials, electrically conductive pastes, or sealing materials, use of a low-melting-point glass that can be applied to semiconductor devices or integrated circuit devices that are extremely sensitive to heat has been desired.

In response to the circumstances described above, an object of the present invention is to provide a glass frit having a low melting point and not containing toxic substances such as lead, arsenic, antimony, and tellurium.

Means for Solving the Problems

The present invention 1 relates to a glass frit comprising: (A) $Ag_2O$, (B) $V_2O_5$, and (C) at least one first oxide selected from the group consisting of $MoO_3$, ZnO, CuO, $TiO_2$, $Bi_2O_3$, $MnO_2$, MgO, $Nb_2O_5$, BaO, and $P_2O_5$.

The present invention 2 relates to the glass frit of the present invention 1, further comprising (D) at least one second oxide selected from the group consisting of $SiO_2$, $Al_2O_3$, SnO, $WO_3$, and $Fe_2O_3$.

The present invention 3 relates to the glass frit of the present invention 1, where component (C) is $MoO_3$ and ZnO, $MoO_3$ and CuO, or ZnO and CuO.

The present invention 4 relates to the glass frit of the present invention 1, where component (C) is $MoO_3$, ZnO, and CuO.

The present invention 5 relates to a glass frit essentially consisting of: (A) $Ag_2O$, (B) $V_2O_5$, and (C) at least one first oxide selected from the group consisting of $MoO_3$, ZnO, CuO, $TiO_2$, $Bi_2O_3$, $MnO_2$, MgO, $Nb_2O_5$, BaO, and $P_2O_5$.

The present invention 6 relates to a glass frit essentially consisting of: (A) $Ag_2O$, (B) $V_2O_5$, and (C) two first oxides selected from the group consisting of $MoO_3$, ZnO, CuO, $TiO_2$, $Bi_2O_3$, $MnO_2$, MgO, $Nb_2O_5$, BaO, and $P_2O_5$.

The present invention 7 relates to a glass frit essentially consisting of: (A) $Ag_2O$, (B) $V_2O_5$, (C) at least one first oxide selected from the group consisting of $MoO_3$, ZnO, CuO, $TiO_2$, $Bi_2O_3$, $MnO_2$, MgO, $Nb_2O_5$, BaO, and $P_2O_5$, and (D) at least one second oxide selected from the group consisting of $SiO_2$, $Al_2O_3$, SnO, $WO_3$, and $Fe_2O_3$.

The present invention 8 relates to a glass frit essentially consisting of: (A) $Ag_2O$, (B) $V_2O_5$, and (C) $MoO_3$.

The present invention 9 relates to a glass frit essentially consisting of: (A) $Ag_2O$, (B) $V_2O_5$, and (C) $MoO_3$ and ZnO.

The present invention 10 relates to a glass frit essentially consisting of: (A) $Ag_2O$, (B) $V_2O_5$, and (C) $MoO_3$ and CuO.

The present invention 11 relates to a glass frit essentially consisting of: (A) $Ag_2O$, (B) $V_2O_5$, and (C) ZnO and CuO.

The present invention 12 relates to a glass frit essentially consisting of: (A) $Ag_2O$, (B) $V_2O_5$, and (C) $MoO_3$, ZnO, and CuO.

The present invention 13 relates to a glass frit essentially consisting of: (A) $Ag_2O$, (B) $V_2O_5$, (C) $MoO_3$, and (D) at least one oxide selected from the group consisting of $SiO_2$, $Al_2O_3$, SnO, $WO_3$, and $Fe_2O_3$.

The present invention 14 relates to the glass frit of any of the present inventions 1 to 13, where the component (A) content is 40 to 70% by mass, the component (B) content is 10 to 40% by mass, and the component (C) content is 0.5 to 30% by mass, with respect to the total mass in terms of oxides.

The present invention 15 relates to the glass frit of the present invention 14, where the content of a first oxide selected from $MoO_3$, ZnO, CuO, $TiO_2$, $Bi_2O_3$, $MnO_2$, MgO, $Nb_2O_5$, BaO, or $P_2O_5$ in component (C) is 0.5 to 15% by mass, with respect to the total mass in terms of oxides.

The present invention 16 relates to the glass frit of any of the present inventions 1 to 15, where the mass ratio of component (A) to component (B) ($Ag_2O/V_2O_5$) is 1.8 to 3.2.

The present invention 17 relates to the glass frit of any of the present inventions 2 and 13 to 16, where the component (D) content is 0 to 15% by mass with respect to the total mass in terms of oxides.

The present invention 18 relates to the glass frit of any of the present inventions 9 and 14 to 17, where the mass ratio ($MoO_3$:ZnO) of $MoO_3$ to ZnO in component (C) is 12:1 to 1:12.

The present invention 19 relates to the glass frit of any of the present inventions 10 and 14 to 17, where the mass ratio ($MoO_3$:CuO) of $MoO_3$ to CuO in component (C) is 12:1 to 1:10.

The present invention 20 relates to the glass frit of any of the present inventions 11 and 14 to 17, where the mass ratio (ZnO:CuO) of ZnO to CuO in component (C) is 12:1 to 1:12.

The present invention 21 relates to the glass frit of any of the present inventions 12 and 14 to 17, where the mass ratio ($MoO_3$:total amount of ZnO and CuO) of $MoO_3$ to the total amount of ZnO and CuO in component (C) is 12:1 to 1:12.

Effect of the Invention

The present invention can provide a glass frit having a low melting point and not containing toxic substances such as lead (Pb), arsenic (As), antimony (Sb), and tellurium (Te). The glass frit having a low melting point of the present invention has, for example, a glass transition temperature (Tg) of 300° C. or lower, a crystallization temperature (Tc) of 350° C. or lower, and a crystal-remelting temperature (Tr) of 500° C. or lower. The glass frit of the present invention can be used in die attach materials, electrically conductive pastes, or sealing materials.

MODE FOR CARRYING OUT THE INVENTION

Glass Frit

The present invention relates to a glass frit containing: (A) $Ag_2O$, (B) $V_2O_5$, and (C) at least one first oxide selected from the group consisting of $MoO_3$, ZnO, CuO, $TiO_2$, $Bi_2O_3$, $MnO_2$, MgO, $Nb_2O_5$, BaO, and $P_2O_5$.

The glass frit preferably has properties described below.

(1) The glass transition temperature (Tg) of the glass frit is preferably 300° C. or lower, more preferably 250° C. or lower, even more preferably 200° C. or lower, and particularly preferably 180° C. or lower. The lower the glass transition temperature (Tg) of the glass frit is, the lower the treatment temperature can be. On the other hand, the glass transition temperature (Tg) of the glass frit is preferably 80° C. or higher so that high thermal stress resistance properties of the glass can be maintained.

(2) The crystallization temperature (Tc) of the glass frit is preferably 400° C. or lower, more preferably 380° C. or lower, even more preferably 350° C. or lower, and particularly preferably 300° C. or lower. The lower the crystallization temperature (Tc) of the glass frit is, the lower the treatment temperature can be. On the other hand, the crystallization temperature (Tc) of the glass frit is preferably 100° C. or higher so that high thermal stress resistance properties of the glass can be maintained.

(3) The crystal-remelting temperature (Tr) of the glass frit is preferably 500° C. or lower, more preferably 480° C. or lower, even more preferably 450° C. or lower, and particularly preferably 400° C. or lower. The lower the crystal-remelting temperature (Tr) of the glass frit is, the lower the treatment temperature can be. On the other hand, the crystal-remelting temperature (Tr) of the glass frit is preferably 200° C. or higher so that high thermal stress resistance properties of the glass can be maintained.

The glass frit preferably has a glass transition temperature (Tg) of 300° C. or lower, a crystallization temperature (Tc) of 350° C. or lower, and a crystal-remelting temperature (Tr) of 500° C. or lower. The glass frit of the present invention can be used in, for example, die attach materials, electrically conductive pastes, or sealing materials. Examples of the electrically conductive paste include electrically conductive pastes for forming electrodes. The die attach material or the electrically conductive paste is required to have electrical conductivity or thermal conductivity. The sealing material is not required to have electrical conductivity or thermal conductivity.

A die attach material, electrically conductive paste, or sealing material containing the glass frit of the present invention can bond an adherend by sufficiently wetting and spreading over the adhesive interface since the fluidity thereof is enhanced at relatively low treatment temperatures (e.g., 500° C. or lower). Furthermore, the glass frit of the present invention allows crystallization to proceed adequately without causing excessive crystallization since the glass frit recrystallizes at relatively low temperatures of 350° C. or lower, thereby bringing the state of the crystals closer to a eutectic state. Furthermore, the glass frit of the present invention has a crystal-remelting temperature (Tr) of 500° C. or lower. A device that uses a die attach material, electrically conductive paste, or sealing material containing the glass frit of the present invention can inhibit cracking or the like that is caused by inconsistency in expansion rates between an adherend and a crystallized glass structure when, after the adherend has been bonded, the device is placed under conditions where electronic components or the like containing the adherend are subjected to thermal cycles. The die attach material, electrically conductive paste, or sealing material containing the glass frit of the present invention can exhibit high thermal stress resistance and maintain high adhesion. The glass frit of the present invention can be used in die attach materials, electrically conductive pastes, or sealing materials that can be applied to adherends that are extremely sensitive to heat. Examples of adherends that are extremely sensitive to heat include electronic components, such as display devices and ceramic packages for housing integrated circuit devices, and the like.

Component (C) of the glass frit contains at least one first oxide selected from the group consisting of $MoO_3$, ZnO, CuO, $TiO_2$, $Bi_2O_3$, $MnO_2$, MgO, $Nb_2O_5$, BaO, and $P_2O_5$, and may contain two or more first oxides or three or more first oxides.

When the glass frit contains two or more first oxides of component (C), component (C) is preferably $MoO_3$ and ZnO, $MoO_3$ and CuO, or ZnO and CuO.

When the glass frit contains three or more first oxides of component (C), component (C) is preferably $MoO_3$, ZnO, and CuO.

The glass frit of the present invention preferably further contains (D) at least one second oxide selected from the group consisting of $SiO_2$, $Al_2O_3$, SnO, $WO_3$, and $Fe_2O_3$. The glass frit of the present invention allows crystallization to proceed adequately without causing excessive crystallization since the contained second oxide, which is component (D), allows formation of crystals that are in a more complicated, eutectic state. The glass frit of the present invention can be used in, for example, die attach materials, electrically conductive pastes, or sealing materials. A device that uses a die attach material, electrically conductive paste, or sealing material containing the glass frit of the present invention can inhibit cracking or the like that is caused by inconsistency in expansion rates between an adherend and a crystallized glass structure when, after the adherend has been bonded, the device is placed under conditions where electronic components or the like containing the adherend are subjected to thermal cycles. The die attach material, electrically conductive paste, or sealing material containing the glass frit of the present invention can exhibit high thermal stress resistance and maintain high adhesion.

The glass frit of the present invention preferably essentially consists of: (A) $Ag_2O$, (B) $V_2O_5$, and (C) at least one first oxide selected from the group consisting of $MoO_3$, ZnO, CuO, $TiO_2$, $Bi_2O_3$, $MnO_2$, MgO, $Nb_2O_5$, BaO, and $P_2O_5$.

The glass frit of the present invention preferably essentially consists of: (A) $Ag_2O$, (B) $V_2O_5$, and (C) two first oxides selected from the group consisting of $MoO_3$, ZnO, CuO, $TiO_2$, $Bi_2O_3$, $MnO_2$, MgO, $Nb_2O_5$, BaO, and $P_2O_5$.

The glass frit of the present invention preferably essentially consists of: (A) $Ag_2O$, (B) $V_2O_5$, (C) at least one first oxide selected from the group consisting of $MoO_3$, ZnO, CuO, $TiO_2$, $Bi_2O_3$, $MnO_2$, MgO, $Nb_2O_5$, BaO, and $P_2O_5$, and (D) at least one second oxide selected from the group consisting of $SiO_2$, $Al_2O_3$, SnO, $WO_3$, and $Fe_2O_3$.

The glass frit preferably essentially consists of: (A) $Ag_2O$, (B) $V_2O_5$, and (C) $MoO_3$. A die attach material, electrically conductive paste, or sealing material containing the glass frit exhibits excellent adhesion at low temperatures (e.g., 500° C. or lower). Furthermore, the die attach material, electrically conductive paste, or sealing material containing the glass frit exhibits excellent thermal stress resistance after bonding.

In the glass frit of the present invention, the composition thereof preferably has a component (A) content of 40 to 70% by mass, a component (B) content of 10 to 40% by mass, and a component (C) content of 0.5 to 30% by mass, with respect to the total mass in terms of oxides. When the composition of each component is within the range described above, the glass frit has a preferable glass transition temperature (Tg: 300° C. or lower, for example), a preferable crystallization temperature (Tc: 400° C. or lower, for example), and a preferable crystal-remelting temperature (Tr: 500° C. or lower, for example). The glass frit can be used in, for example, die attach materials, electrically conductive pastes, or sealing materials. A die attach material, electrically conductive paste, or sealing material containing the glass frit of the present invention can enhance fluidity at relatively low treatment temperatures (e.g., 500° C. or lower). Furthermore, a die attach material, electrically conductive paste, or sealing material containing the glass frit can bond an adherend at relatively low temperatures (e.g., 500° C. or lower).

Furthermore, the glass frit of the present invention does not excessively crystallize since the glass frit recrystallizes at relatively low temperatures (e.g., 400° C. or lower) and approaches a eutectic state. A die attach material, electrically conductive paste, or sealing material containing the glass frit of the present invention can exhibit high thermal stress resistance and maintain high adhesion after being bonded to an adherend. In the glass frit of the present invention, when the composition of each component is out of the range described above, adhesion or the like may be affected since melting of the glass frit in lower temperature ranges (e.g., 450° C. or lower) becomes difficult.

In the present description, the composition of each component contained in the glass frit is expressed in % by mass with respect to the total mass of the glass frit in terms of oxide, unless otherwise specified.

In the glass frit of the present invention, the composition thereof more preferably has a component (A) content of 50 to 70% by mass, a component (B) content of 10 to 35% by mass, and a component (C) content of 0.5 to 20% by mass, with respect to the total mass in terms of oxides.

Furthermore, in the glass frit of the present invention, the composition thereof more preferably has a component (A) content of 52 to 70% by mass, a component (B) content of 10 to 33% by mass, and a component (C) content of 0.5 to 15% by mass, with respect to the total mass in terms of oxides.

When the glass frit of the present invention contains two or more substances in component (C), the content of a substance selected from $MoO_3$, ZnO, CuO, $TiO_2$, $Bi_2O_3$, $MnO_2$, MgO, $Nb_2O_5$, BaO, or $P_2O_5$ is preferably 0.5 to 15% by mass, more preferably 0.5 to 10% by mass, and even more preferably 1 to 8% by mass.

In the glass frit of the present invention, the component (D) content is preferably 0 to 15% by mass, more preferably 0.5 to 12% by mass, and even more preferably 0.5 to 10% by mass, with respect to the total mass in terms of oxides.

In the glass frit of the present invention, the mass ratio ($Ag_2O/V_2O_5$) of component (A) to component (B) is preferably 1.8 to 3.2, more preferably 1.8 to 3.0, even more preferably 1.95 to 2.7, and particularly preferably 1.95 to 2.6. When the mass ratio ($Ag_2O/V_2O_5$) of component (A) to component (B) is within the range described above, the glass frit has a preferable glass transition temperature (Tg: 300° C. or lower, for example), a preferable crystallization temperature (Tc: 400° C. or lower, for example), and a preferable crystal-remelting temperature (Tr: 500° C. or lower, for example). The glass frit of the present invention can be used in, for example, die attach materials, electrically conductive pastes, or sealing materials. A die attach material, electrically conductive paste, or sealing material containing the glass frit of the present invention can bond an adherend since the fluidity thereof is enhanced at relatively low treatment temperatures (e.g., 500° C. or lower). Furthermore, the glass frit of the present invention does not excessively crystallize since the glass frit recrystallizes at relatively low temperatures (e.g., at 400° C. or lower) and approaches a eutectic state. A die attach material, electrically conductive paste, or sealing material containing the glass frit of the present invention can exhibit high thermal stress resistance and maintain high adhesion after being bonded to an adherend. In the glass frit of the present invention, when the mass ratio ($Ag_2O/V_2O_5$) of component (A) to component (B) is out of the range described above, adhesion or the like may be affected since melting of the glass frit in lower temperature ranges (e.g., 450° C. or lower) becomes difficult.

The glass frit of the present invention preferably essentially consists of: (A) $Ag_2O$, (B) $V_2O_5$, and (C) $MoO_3$. A die attach material, electrically conductive paste, or sealing material containing the glass frit exhibits excellent adhesion at low temperatures (e.g., 500° C. or lower). Furthermore, the die attach material, electrically conductive paste, or sealing material containing the glass frit exhibits excellent thermal stress resistance after bonding.

The glass frit preferably has the following composition.

(A) The $Ag_2O$ content is preferably 40 to 70% by mass, more preferably 45 to 70% by mass, and even more preferably 50 to 68% by mass.

(B) The $V_2O_5$ content is preferably 10 to 40% by mass, more preferably 12 to 35% by mass, and even more preferably 15 to 32% by mass.

(C) The $MoO_3$ content is preferably 0.5 to 30% by mass, more preferably 0.5 to 20% by mass, even more preferably 0.5 to 15% by mass, yet even more preferably 0.5 to 12% by mass, and particularly preferably 0.5 to 10% by mass.

The mass ratio ($Ag_2O/V_2O_5$) of component (A) to component (B) is preferably 1.8 to 3.2, more preferably 1.8 to 3.0, even more preferably 1.95 to 2.7, and particularly preferably 1.95 to 2.6.

The glass frit preferably essentially consists of: (A) 40 to 70% by mass of $Ag_2O$, (B) 10 to 40% by mass of $V_2O_5$, and (C) 0.5 to 30% by mass of $MoO_3$, and the mass ratio ($Ag_2O/V_2O_5$) of component (A) to component (B) is preferably 1.8 to 3.2.

The glass frit preferably essentially consists of: (A) $Ag_2O$, (B) $V_2O_5$, and (C) ZnO. The glass frit can be used in die attach materials, electrically conductive pastes, or sealing materials. A die attach material, electrically conductive paste, or sealing material containing the glass frit exhibits excellent adhesion at low temperatures (e.g., 500° C. or lower). Furthermore, the die attach material, electrically conductive paste, or sealing material containing the glass frit exhibits excellent thermal stress resistance after bonding.

The glass frit preferably has the following composition.

(A) The $Ag_2O$ content is preferably 40 to 70% by mass, more preferably 45 to 70% by mass, and even more preferably 50 to 68% by mass.

(B) The $V_2O_5$ content is preferably 10 to 40% by mass, more preferably 12 to 35% by mass, and even more preferably 15 to 32% by mass.

(C) The ZnO content is preferably 0.5 to 30% by mass, more preferably 0.5 to 20% by mass, even more preferably 0.5 to 15% by mass, and yet even more preferably 0.5 to 10% by mass.

The mass ratio ($Ag_2O/V_2O_5$) of component (A) to component (B) is preferably 1.8 to 3.2, more preferably 1.8 to 3.0, even more preferably 1.95 to 2.7, and particularly preferably 1.95 to 2.6.

The glass frit preferably essentially consists of: (A) 40 to 70% by mass of $Ag_2O$, (B) 10 to 40% by mass of $V_2O_5$, and (C) 0.5 to 30% by mass of ZnO, and the mass ratio ($Ag_2O/V_2O_5$) of component (A) to component (B) is preferably 1.8 to 3.2.

The glass frit preferably essentially consists of: (A) $Ag_2O$, (B) $V_2O_5$, and (C) CuO. A die attach material, electrically conductive paste, or sealing material containing the glass frit exhibits excellent adhesion at low temperatures (e.g., 500° C. or lower). Furthermore, the die attach material, electrically conductive paste, or sealing material containing the glass frit exhibits excellent thermal stress resistance after bonding.

The glass frit preferably has the following composition.

(A) The $Ag_2O$ content is preferably 40 to 70% by mass, more preferably 45 to 70% by mass, and even more preferably 50 to 68% by mass.

(B) The $V_2O_5$ content is preferably 10 to 40% by mass, more preferably 12 to 35% by mass, and even more preferably 15 to 32% by mass.

(C) The CuO content is preferably 0.5 to 30% by mass, more preferably 0.5 to 20% by mass, even more preferably 0.5 to 15% by mass, and yet even more preferably 1 to 15% by mass.

The mass ratio ($Ag_2O/V_2O_5$) of component (A) to component (B) is preferably 1.8 to 3.2, more preferably 1.8 to 3.0, even more preferably 1.95 to 2.7, and particularly preferably 1.95 to 2.6.

The glass frit preferably essentially consists of: (A) 40 to 70% by mass of $Ag_2O$, (B) 10 to 40% by mass of $V_2O_5$, and (C) 0.5 to 30% by mass of CuO, and the mass ratio ($Ag_2O/V_2O_5$) of component (A) to component (B) is preferably 1.8 to 3.2.

The glass frit of the present invention preferably essentially consists of: (A) $Ag_2O$, (B) $V_2O_5$, and (C) $MoO_3$ and ZnO. A die attach material, electrically conductive paste, or sealing material containing the glass frit exhibits excellent adhesion at low temperatures (e.g., 500° C. or lower). Furthermore, the die attach material, electrically conductive paste, or sealing material containing the glass frit exhibits excellent thermal stress resistance after bonding.

The glass frit preferably has the following composition.

(A) The $Ag_2O$ content is preferably 40 to 70% by mass, more preferably 45 to 70% by mass, and even more preferably 50 to 68% by mass.

(B) The $V_2O_5$ content is preferably 10 to 40% by mass, more preferably 12 to 35% by mass, and even more preferably 15 to 32% by mass.

(C-1) The $MoO_3$ content is preferably 0.5 to 30% by mass, more preferably 0.5 to 20% by mass, even more preferably 0.5 to 15% by mass, yet even more preferably 0.5 to 12% by mass, and particularly preferably 0.5 to 10% by mass.

(C-2) The ZnO content is preferably 0.5 to 15% by mass, more preferably 0.5 to 12% by mass, and even more preferably 0.5 to 10% by mass.

The mass ratio ($Ag_2O/V_2O_5$) of component (A) to component (B) is preferably 1.8 to 3.2, more preferably 1.8 to 3.0, even more preferably 1.95 to 2.7, and particularly preferably 1.95 to 2.6.

The mass ratio ($MoO_3$:ZnO) of $MoO_3$ to ZnO in component (C) is preferably 12:1 to 1:12, more preferably 10:1 to 1:10, and particularly preferably 8:1 to 1:8.

The glass frit preferably essentially consists of (A) 40 to 70% by mass of $Ag_2O$, (B) 10 to 40% by mass of $V_2O_5$, (C-1) 0.5 to 30% by mass of $MoO_3$, and (C-2) 0.5 to 15% by mass of ZnO, the mass ratio ($Ag_2O/V_2O_5$) of component (A) to component (B) is preferably 1.8 to 3.2, and the mass ratio ($MoO_3$:ZnO) of $MoO_3$ to ZnO in component (C) is preferably 12:1 to 1:12.

More particularly, the glass frit preferably has the following composition.

(A) The $Ag_2O$ content is preferably 52 to 65% by mass.
(B) The $V_2O_5$ content is preferably 15 to 30% by mass.
(C-1) The $MoO_3$ content is preferably 0.5 to 12% by mass.
(C-2) The ZnO content is preferably 0.5 to 12% by mass.

The glass frit preferably essentially consists of: (A) 52 to 65% by mass of $Ag_2O$, (B) 15 to 30% by mass of $V_2O_5$, (C-1) 0.5 to 12% by mass of $MoO_3$, and (C-2) 0.5 to 12% by mass of ZnO.

The glass frit of the present invention preferably essentially consists of: (A) $Ag_2O$, (B) $V_2O_5$, and (C) $MoO_3$ and CuO. A die attach material, electrically conductive paste, or sealing material containing the glass frit exhibits excellent adhesion at low temperatures (e.g., 500° C. or lower). Furthermore, the die attach material, electrically conductive paste, or sealing material containing the glass frit exhibits excellent thermal stress resistance after bonding.

The glass frit preferably has the following composition.

(A) The $Ag_2O$ content is preferably 40 to 70% by mass, more preferably 45 to 70% by mass, and even more preferably 50 to 68% by mass.

(B) The $V_2O_5$ content is preferably 10 to 40% by mass, more preferably 15 to 35% by mass, and even more preferably 20 to 32% by mass.

(C-1) The $MoO_3$ content is preferably 0.5 to 30% by mass, more preferably 0.5 to 20% by mass, even more preferably 0.5 to 15% by mass, yet even more preferably 0.5 to 12% by mass, and particularly preferably 0.5 to 10% by mass.

(C-2) The CuO content is preferably 0.5 to 15% by mass, more preferably 0.5 to 12% by mass, and even more preferably 0.5 to 10% by mass.

The mass ratio ($Ag_2O/V_2O_5$) of component (A) to component (B) is preferably 1.8 to 3.2, more preferably 1.8 to 3.0, even more preferably 1.95 to 2.7, and particularly preferably 1.95 to 2.6.

The mass ratio ($MoO_3$:CuO) of $MoO_3$ to CuO in component (C) is preferably 12:1 to 1:10, more preferably 10:1 to 1:5, and particularly preferably 8:1 to 1:4.

The glass frit preferably essentially consists of (A) 40 to 70% by mass of $Ag_2O$, (B) 10 to 40% by mass of $V_2O_5$, (C-1) 0.5 to 30% by mass of $MoO_3$, and (C-2) 0.5 to 15% by mass of CuO, the mass ratio ($Ag_2O/V_2O_5$) of component (A) to component (B) is preferably 1.8 to 3.2, and the mass ratio ($MoO_3$:CuO) of $MoO_3$ to CuO in component (C) is preferably 12:1 to 1:10.

More particularly, the glass frit preferably has the following composition.

(A) The $Ag_2O$ content is preferably 55 to 65% by mass.
(B) The $V_2O_5$ content is preferably 25 to 30% by mass.
(C-1) The $MoO_3$ content is preferably 0.5 to 12% by mass.
(C-2) The CuO content is preferably 0.5 to 12% by mass.

The glass frit preferably essentially consists of: (A) 55 to 65% by mass of $Ag_2O$, (B) 25 to 30% by mass of $V_2O_5$, (C-1) 0.5 to 12% by mass of $MoO_3$, and (C-2) 0.5 to 12% by mass of CuO.

The glass frit of the present invention preferably essentially consists of: (A) $Ag_2O$, (B) $V_2O_5$, and (C) ZnO and CuO. A die attach material, electrically conductive paste, or sealing material containing the glass frit exhibits excellent adhesion at low temperatures (e.g., 500° C. or lower). Furthermore, the die attach material, electrically conductive paste, or sealing material containing the glass frit exhibits excellent thermal stress resistance in thermal cycles after bonding.

The glass frit preferably has the following composition.

(A) The $Ag_2O$ content is preferably 40 to 70% by mass, more preferably 45 to 70% by mass, and even more preferably 50 to 68% by mass.

(B) The $V_2O_5$ content is preferably 10 to 40% by mass, more preferably 12 to 35% by mass, and even more preferably 15 to 30% by mass.

(C-1) The ZnO content is preferably 0.5 to 30% by mass, more preferably 0.5 to 20% by mass, even more preferably 0.5 to 15% by mass, yet even more preferably 0.5 to 10% by mass, and particularly preferably 0.5 to 8% by mass.

(C-2) The CuO content is preferably 0.5 to 15% by mass, more preferably 0.5 to 12% by mass, and even more preferably 0.5 to 10% by mass.

The mass ratio ($Ag_2O/V_2O_5$) of component (A) to component (B) is preferably 1.8 to 3.2, more preferably 1.8 to 3.0, even more preferably 1.95 to 2.7, and particularly preferably 1.95 to 2.6.

The mass ratio (ZnO:CuO) of ZnO to CuO in component (C) is preferably 12:1 to 1:12, more preferably 10:1 to 1:10, and particularly preferably 5:1 to 1:5.

The glass frit preferably essentially consists of (A) 40 to 70% by mass of $Ag_2O$, (B) 10 to 40% by mass of $V_2O_5$, (C-1) 0.5 to 30% by mass of ZnO, and (C-2) 0.5 to 15% by mass of CuO, the mass ratio ($Ag_2O/V_2O_5$) of component (A) to component (B) is preferably 1.8 to 3.2, and the mass ratio (ZnO:CuO) of ZnO to CuO in component (C) is preferably 12:1 to 1:12.

The glass frit preferably has the following composition.

(A) The $Ag_2O$ content is preferably 55 to 65% by mass.
(B) The $V_2O_5$ content is preferably 25 to 30% by mass.
(C-1) The ZnO content is preferably 0.5 to 10% by mass.
(C-2) The CuO content is preferably 0.5 to 10% by mass.

The glass frit preferably essentially consists of: (A) 55 to 65% by mass of $Ag_2O$, (B) 25 to 30% by mass of $V_2O_5$, (C-1) 0.5 to 10% by mass of ZnO, and (C-2) 0.5 to 10% by mass of CuO.

The glass frit preferably essentially consists of: (A) $Ag_2O$, (B) $V_2O_5$, and (C) $MoO_3$, ZnO, and CuO. A die attach material, electrically conductive paste, or sealing material containing the glass frit exhibits excellent adhesion at low temperatures (e.g., 500° C. or lower). Furthermore, the die attach material, electrically conductive paste, or sealing material containing the glass frit exhibits excellent thermal stress resistance after bonding.

The glass frit preferably has the following composition.

(A) The $Ag_2O$ content is preferably 40 to 70% by mass, more preferably 45 to 70% by mass, and even more preferably 50 to 68% by mass.

(B) The $V_2O_5$ content is preferably 10 to 40% by mass, more preferably 12 to 35% by mass, and even more preferably 15 to 32% by mass.

(C-1) The $MoO_3$ content is preferably 0.5 to 30% by mass, more preferably 0.5 to 20% by mass, even more preferably 0.5 to 15% by mass, yet even more preferably 0.5 to 12% by mass, and particularly preferably 0.5 to 10% by mass.

(C-2) The ZnO content is preferably 0.5 to 15% by mass, more preferably 0.5 to 12% by mass, and even more preferably 0.5 to 10% by mass.

(C-3) The CuO content is preferably 0.5 to 15% by mass, more preferably 0.5 to 12% by mass, and even more preferably 0.5 to 10% by mass.

The mass ratio ($Ag_2O/V_2O_5$) of component (A) to component (B) is preferably 1.8 to 3.2, more preferably 1.8 to 3.0, even more preferably 1.95 to 2.7, and particularly preferably 1.95 to 2.6.

The mass ratio ($MoO_3$:total of ZnO and CuO) of $MoO_3$ to the total of ZnO and CuO in component (C) is preferably 12:1 to 1:12, more preferably 10:1 to 1:10, and particularly preferably 8:1 to 1:8. Furthermore, in the total mass of ZnO and CuO, the mass ratio (ZnO:CuO) of ZnO to CuO is preferably 12:1 to 1:12, and more preferably 10:1 to 1:10.

The glass frit preferably essentially consists of: (A) 40 to 70% by mass of $Ag_2O$, (B) 10 to 40% by mass of $V_2O_5$, (C-1) 0.5 to 30% by mass of $MoO_3$, (C-2) 0.5 to 15% by mass of ZnO, and (C-3) 0.5 to 15% by mass of CuO, the mass ratio ($Ag_2O/V_2O_5$) of component (A) to component (B) is preferably 1.8 to 3.2, the mass ratio ($MoO_3$:total of ZnO and CuO) of $MoO_3$ to the total of ZnO and CuO in component (C) is preferably 12:1 to 1:12, and, in the total mass of ZnO and CuO, the mass ratio (ZnO:CuO) of ZnO to CuO is 12:1 to 1:12.

More particularly, the glass frit preferably has the following composition.

(A) The $Ag_2O$ content is preferably 55 to 65% by mass.
(B) The $V_2O_5$ content is preferably 25 to 30% by mass.
(C-1) The $MoO_3$ content is preferably 0.5 to 12% by mass.
(C-2) The ZnO content is preferably 0.5 to 10% by mass.
(C-3) The CuO content is preferably 0.5 to 5% by mass.

The glass frit preferably essentially consists of: (A) 55 to 65% by mass of $Ag_2O$, (B) 25 to 30% by mass of $V_2O_5$, (C-1) 0.5 to 12% by mass of $MoO_3$, (C-2) 0.5 to 10% by mass of ZnO, and (C-3) 0.5 to 5% by mass of CuO.

The glass frit of the present invention preferably essentially consists of: (A) $Ag_2O$, (B) $V_2O_5$, (C) $MoO_3$, and (D) at least one oxide selected from the group consisting of $SiO_2$, $Al_2O_3$, SnO, $WO_3$, and $Fe_2O_3$. A die attach material, electrically conductive paste, or sealing material containing the glass frit exhibits excellent adhesion at low temperatures (e.g., 500° C. or lower). Furthermore, the die attach material, electrically conductive paste, or sealing material containing the glass frit exhibits excellent thermal stress resistance after bonding.

The glass frit preferably has the following composition.

(A) The $Ag_2O$ content is preferably 40 to 70% by mass, more preferably 45 to 70% by mass, and even more preferably 50 to 68% by mass.

(B) The $V_2O_5$ content is preferably 10 to 40% by mass, more preferably 12 to 35% by mass, and even more preferably 15 to 32% by mass.

(C) The $MoO_3$ content is preferably 0.5 to 30% by mass, more preferably 0.5 to 20% by mass, even more preferably 0.5 to 15% by mass, yet even more preferably 0.5 to 10% by mass, and particularly preferably 0.5 to 8% by mass.

(D) The content of at least one oxide selected from the group consisting of $SiO_2$, $Al_2O_3$, SnO, $WO_3$, and $Fe_2O_3$ is preferably 0 to 15% by mass, more preferably 0.5 to 12% by mass, even more preferably 1 to 10% by mass, and particularly preferably 1 to 8% by mass.

The mass ratio ($Ag_2O/V_2O_5$) of component (A) to component (B) is preferably 1.8 to 3.2, more preferably 1.8 to 3.0, even more preferably 1.95 to 2.7, and particularly preferably 1.95 to 2.6.

The glass frit preferably essentially consists of: (A) 40 to 70% by mass of $Ag_2O$, (B) 10 to 40% by mass of $V_2O_5$, (C) 0.5 to 30% by mass of $MoO_3$, and (D) 0 to 15% by mass of at least one oxide selected from the group consisting of $SiO_2$, $Al_2O_3$, SnO, $WO_3$, and $Fe_2O_3$, and the mass ratio ($Ag_2O/V_2O_5$) of component (A) to component (B) is preferably 1.8 to 3.2.

The glass frit can be produced by the method described below.

First, as the raw materials of the glass frit, powders of oxides are weighed, mixed, and charged in a crucible. As the raw materials of the glass frit, the crucible, in which the powders of oxides, used as the raw materials, are charged, is placed in a heated oven. The raw materials of the glass frit are heated to the melt temperature of the glass frit (e.g., 700° C.) in the oven, and then maintained at the melt temperature in the oven until the raw materials are fully melted. Thereafter, the crucible containing the melted raw materials of the glass frit is removed from the oven, and the melted raw materials are uniformly stirred. The melted raw materials of the glass frit are then placed on two stainless steel rolls, and the melted raw materials of the glass frit are kneaded by rotating the two rolls using a motor and rapidly cooled at room temperature to form plate glass. Finally, the plate glass can be uniformly dispersed while being crushed in a mortar, and classified using a mesh sieve to obtain a glass frit having a desired particle size. By collecting particles that pass through a 100 mesh sieve but remain on a 200 mesh sieve, a glass frit having an average diameter of 149 µm (median diameter) can be obtained. Note that glass frit sizes are not limited to those described in the Examples, and glass frits having a larger average diameter or a smaller average diameter can be obtained depending on the mesh size of the sieve.

Die Attach Material or Electrically Conductive Paste

The glass frit can be used in die attach materials or electrically conductive pastes required to have electrical conductivity and/or thermal conductivity.

Die attach materials or the electrically conductive pastes contain glass frit, electrically conductive powder, and an organic vehicle. The glass frit in a die attach material or an electrically conductive paste play an important role in reducing contact resistance between a silicon chip (die) and a substrate such as a metal ceramic when, for example, the chip and the substrate are bonded using the die attach material or the electrically conductive paste. A die attach material or electrically conductive paste containing glass frit, electrically conductive powder, and an organic vehicle exhibits excellent adhesion at low temperatures (e.g., 500° C. or lower). Furthermore, a die attach material or electrically conductive paste containing the glass frit of the present invention exhibits excellent thermal stress resistance after bonding.

The electrically conductive powder contained in a die attach material or an electrically conductive paste is preferably silver powder.

The glass frit content of a die attach material or an electrically conductive paste is preferably 0.1 to 10 parts by mass, more preferably 0.2 to 5 parts by mass, and even more preferably 0.3 to 3 parts by mass, per 100 parts by mass of the electrically conductive powder.

Die attach materials or electrically conductive pastes contain an organic vehicle. Examples of organic vehicles include organic binders and solvents. Organic binders and solvents have such functions as controlling the viscosity of the die attach material or the electrically conductive paste, and organic binders and solvents are not particularly limited. The organic binder can be also used after being dissolved in a solvent.

The organic binder to be used can be selected from cellulose-based resins (e.g., ethyl cellulose, nitrocellulose, and the like) or (meth)acrylic resins (e.g., polymethyl acrylate, polymethyl methacrylate, and the like). The organic binder content of the die attach material or the electrically conductive paste is typically 0.2 to 30 parts by mass, and preferably 0.4 to 5 parts by mass, per 100 parts by mass of the electrically conductive powder.

As the solvent to be used, one, or two or more solvents can be selected from alcohols (e.g., terpineol, α-terpineol, β-terpineol, and the like) and esters (e.g., hydroxy group-containing esters, 2,2,4-trimethyl-1,3-pentanediol monoisobutyrate, butyl carbitol acetate, and the like). The solvent content of the die attach material or the electrically conductive paste is typically 0.5 to 30 parts by mass, and preferably 5 to 25 parts by mass, per 100 parts by mass of the electrically conductive powder.

Additives selected from plasticizers, antifoaming agents, dispersing agents, leveling agents, stabilizing agents, adhesion promoting agents, or the like can be further formulated in the electrically conductive paste if necessary. Among these, the plasticizer to be used can be selected from phthalic acid esters, glycolic acid esters, phosphoric acid esters, sebacic acid esters, adipic acid esters, citric acid esters, and the like.

Next, a method for producing a die attach material or an electrically conductive paste is described.

The method for producing a die attach material or an electrically conductive paste includes a step of mixing electrically conductive powder, glass frit, and an organic vehicle. The electrically conductive paste can be produced by adding electrically conductive powder, glass frit, and, optionally, other additives and additive particles to an organic binder and a solvent, and mixing and dispersing the mixture.

The mixing can be performed using, for example, a planetary mixer. Furthermore, the dispersing can be performed using a three-roll mill. The methods of mixing and dispersing are not limited to these methods, and various known methods can be used.

Sealing Material

The glass frit of the present invention can be used in sealing materials for electronic components or the like that are not required to have electrical conductivity or thermal conductivity. The sealing material preferably contains the glass frit of the present invention and inorganic fillers for adjusting the coefficient of linear expansion. The sealing material may be a paste sealing material that further contains an organic vehicle as well as the glass frit. Organic vehicles similar to those used in die attach materials or electrically conductive pastes can be used. As the inorganic fillers for adjusting the coefficient of linear expansion, at least one inorganic filler selected from the group consisting of silica, alumina, zirconia, zirconium silicate, aluminum titanate, mullite, cordierite, eucryptite, spodumene, zirconium phosphate-based compounds, tin oxide-based compounds, and quartz solid solutions can be used.

Sealing materials containing the glass frit of the present invention can be used in sealing processes at low temperatures (e.g., at 500° C. or lower) where thermal effects on adherends are low and thermal energy consumption can be reduced. Sealing materials containing the glass frit of the present invention exhibit excellent thermal stress resistance in thermal cycles also after sealing. Sealing materials containing the glass frit of the present invention can be suitably used as a sealing material for opening parts or joint parts of various electronic components and electric products such as semiconductor devices, semiconductor packages, fluorescent indicator panels, plasma display panels, organic EL display panels, and liquid crystal display panels.

EXAMPLES

The present invention is described below in further detail using Examples and Comparative Examples. However, the present invention is not limited to these Examples.

Examples and Comparative Examples

The glass frit essentially consisting of (A) $Ag_2O$, (B) $V_2O_5$, and (C) one first oxide selected from the group consisting of $MoO_3$, ZnO, CuO, $TiO_2$, $Bi_2O_3$, $MnO_2$, MgO, $Nb_2O_5$, BaO, and $P_2O_5$ is shown in Tables 1 and 2.

In Table 1, Comparative Example 1 is a glass frit essentially consisting of (A) $Ag_2O$, (B) $V_2O_5$, and (C') $TeO_2$, which is a toxic substance. In Table 1, Comparative Example 2 is a glass frit essentially consisting of (A) $Ag_2O$, (B) $V_2O_5$, and (C") $Sb_2O_3$, which is a toxic substance.

The method for producing glass frits is as described below.

As the raw materials of the glass frit, powders of oxides described in Tables 1 and 2 were weighed, mixed, and charged in a crucible (e.g., porcelain crucible: high temperature porcelain manufactured by Fisher Brand, size: 10 mL). As the raw materials of the glass frit, a crucible, in which the powders of oxides that were the raw materials were charged, was placed in an oven (oven: JEL-BURN JM, manufactured by JELENKO, Model: 335300). The raw materials of the glass frit were heated in the oven to the melt temperature designated as "Melt Temp" in Tables 1 and 2. The raw materials of the glass frit were maintained at the melt temperature in the oven and were fully melted. Thereafter, the crucible containing the melted raw materials of the glass frit was removed from the oven, and the melted raw materials were uniformly stirred. The melted raw materials of the glass frit were then placed on two rotatable stainless steel rolls having a diameter of 1.86 inches, and the melted raw materials of the glass frit were kneaded by rotating the two rolls using a motor (BODUNE. DC MOTOR 115V) and rapidly cooled at room temperature to form plate glass. The plate glass was finally uniformly dispersed while being crushed in a mortar, and classified using a 100 mesh sieve and a 200 mesh sieve to obtain a sieve-classified glass frit having a desired size. By collecting those that passed through the 100 mesh sieve but remained on the 200 mesh sieve, a glass frit having an average diameter of 149 μm (median diameter) was obtained. Glass frits having a larger average diameter or a smaller average diameter can be obtained depending on the mesh size of the sieve.

A DSC curve was measured for each glass frit using a differential scanning calorimeter under the following conditions. The glass transition temperature (Tg), crystallization temperature (Tc), and crystal-remelting temperature (Tr) of the glass frit were measured from the DSC curve obtained by differential scanning calorimetry.

Glass Transition Temperature (Tg)

A DSC curve was measured for the glass frit in a temperature region of approximately 50° C. to approximately 370° C. by raising the temperature to 370° C. at a rate of temperature increase of 25° C./min using a differential scanning calorimeter DSC-50 manufactured by Shimadzu. The first inflection point temperature in the DSC curve was taken as the glass transition temperature (Tg). When no inflection point was observed in the DSC curve, the glass transition temperature (Tg) of the glass frit was deemed unmeasurable, which is indicated as "(-)" in Tables 1 to 3.

Crystallization Temperature (Tc)

In a DSC curve measured under the same conditions as for the glass transition temperature (Tg), the temperature at the top of an exothermic peak was taken as the crystallization temperature (Tc). When multiple exothermic peaks were present, the temperature at the top of a first exothermic peak was taken as TC1, the temperature at the top of a second exothermic peak was taken as TC2, and the temperature at the top of a third exothermic peak was taken as TC3. The amounts of heat generated (J/g) at the top of exothermic peaks are shown in Tables 1 to 13.

Crystal-Remelting Temperature (Tr)

In a DSC curve measured under the same conditions as for the glass transition temperature (Tg), the temperature at the top of an endothermic peak was taken as the crystal-remelting temperature (Tr). When multiple endothermic peaks were present, the temperature at the top of a first endothermic peak was taken as TR1, the temperature at the top of a second endothermic peak was taken as TR2, and the temperature at the top of a third endothermic peak was taken as TR3. The amounts of heat generated (J/g) at the top of endothermic peaks are indicated by negative values in Tables 1 to 13. The glass frit obtained was visually examined, and homogeneous glass frit was evaluated as "Good" and heterogeneous glass frit was evaluated as "Bad". The results are shown in Tables 1 and 2.

TABLE 1

| | mesh | Comparative example 1 100/200 | Comparative example 2 100/200 | Example 1 100/200 | Example 2 100/200 | Example 3 100/200 | Example 4 100/200 | Example 5 100/200 | Example 6 100/200 |
|---|---|---|---|---|---|---|---|---|---|
| (A) | $Ag_2O$: 231.7 g/mol | 65.81 | 60.67 | 63.40 | 61.70 | 65.60 | 63.07 | 65.50 | 63.07 |
| (B) | $V_2O_5$: 181.9 g/mol | 30.19 | 27.83 | 29.10 | 28.30 | 30.10 | 28.93 | 30.10 | 28.93 |
| (C) | $MoO_3$: 143.9 g/mol | | 7.50 | 7.5 | 10.00 | | | | |
| | ZnO: 81.4 g/mol | | | | | | | 4.39 | 8.00 |
| | CuO: 79.5 g/mol | | | | | 4.30 | 8.00 | | |
| | $TiO_2$: 79.9 g/mol | | | | | | | | |
| | $Bi_2O_3$: 466.0 g/mol | | | | | | | | |
| | $MnO_2$: 86.9 g/mol | | | | | | | | |
| | MgO: 102 g/mol | | | | | | | | |
| | $Nb_2O_5$: 265.8 g/mol | | | | | | | | |
| | BaO: 153.3 g/mol | | | | | | | | |
| | $P_2O_5$: 141.94 g/mol | | | | | | | | |
| (D) | $SiO_2$: 60.1 g/mol | | | | | | | | |
| | $Al_2O_3$: 102 g/mol | | | | | | | | |
| | SnO: 134.7 g/mol | | | | | | | | |
| | $Fe_2O_3$: 159.7 g/mol | | | | | | | | |
| | $WO_3$ 231.8 g/mol | | | | | | | | |
| (C') | $TeO_2$ 159.6 g/mol | 4.00 | | | | | | | |
| (C") | $Sb_2O_3$ 291.5 g/mol | | 4.00 | | | | | | |
| | Total | 100.00 | 100.00 | 100.0 | 100.00 | 100.00 | 100.00 | 99.99 | 100.00 |
| | $Ag_2O/V_2O_5$ | 2.18 | 2.18 | 2.18 | 2.18 | 2.18 | 2.18 | 2.18 | 2.18 |
| | Melt Temp (C.) | 700 | 700 | 700 | 600 | 700 | 700 | 700 | 700 |
| | Tg (C.) | 125.96 | 161.39 | 147.16 | 152.84 | 142.75 | 157.62 | 133.92 | 136.5 |
| | (mW) | | | | | | | | |
| TC | TC1 − Tg | 37.49 | 22 | 25.88 | 26.13 | 47.32 | 55.67 | 56.16 | 46.29 |
| | TC1 (C.) | 163.45 | 183.39 | 173.04 | 178.97 | 190.07 | 213.49 | 190.08 | 182.79 |
| | (J/g) | 36.4 | 21 | 31.13 | 31.12 | 20.4 | 31.16 | 40.02 | 18.31 |
| | TC2 (C.) | 255.98 | 304.02 | | | 221.41 | | 261.74 | 256.8 |
| | (J/g) | 4.04 | 4.18 | | | 13.41 | | 3.6 | 15.31 |
| | TC3 (C.) | | | | | | | | |
| | (J/g) | | | | | | | | |
| TR | TR1 (C.) | 304.99 | — | 351.23 | 361.92 | 370.27 | 370.57 | 366.44 | 372.17 |
| | (J/g) | −16.53 | — | −49.43 | −27.56 | −60.09 | −46.42 | −62.45 | −47.06 |
| | TR2 (C.) | 359.11 | | | | | | | |
| | (J/g) | −46.21 | | | | | | | |
| | TR3 (C.) | | | | | | | | |
| | (J/g) | | | | | | | | |
| | bach size | 10 g | 10 g | 10 g | 10 g | 10 g | 10 g | 10 g | 10 g |
| | Melt pour | Good | Good | Good | Good | Good | Good | Good | Good |

| | mesh | Example 7 100/200 | Example 8 100/200 | Example 9 100/200 | Example 10 100/200 | Example 11 100/200 | Example 12 100/200 | Example 13 100/200 |
|---|---|---|---|---|---|---|---|---|
| (A) | $Ag_2O$: 231.7 g/mol | 66.50 | 54.29 | 65.34 | 67.02 | 59.61 | 63.07 | 65.20 |
| (B) | $V_2O_5$: 181.9 g/mol | 30.50 | 24.92 | 29.99 | 30.76 | 27.36 | 28.93 | 29.80 |
| (C) | $MoO_3$: 143.9 g/mol | | | | | | | |
| | ZnO: 81.4 g/mol | | | | | | | |
| | CuO: 79.5 g/mol | | | | | | | |
| | $TiO_2$: 79.9 g/mol | 3.00 | | | | | | |
| | $Bi_2O_3$: 466.0 g/mol | | 20.80 | | | | | |
| | $MnO_2$: 86.9 g/mol | | | 4.67 | | | | |
| | MgO: 102 g/mol | | | | 2.22 | | | |
| | $Nb_2O_5$: 265.8 g/mol | | | | | 13.03 | | |
| | BaO: 153.3 g/mol | | | | | | 8.00 | |
| | $P_2O_5$: 141.94 g/mol | | | | | | | 5.00 |

TABLE 1-continued

|  |  |  |  |  |  |  |  |  |
|---|---|---|---|---|---|---|---|---|
| (D) | SiO$_2$: 60.1 g/mol | | | | | | | |
|  | Al$_2$O$_3$: 102 g/mol | | | | | | | |
|  | SnO: 134.7 g/mol | | | | | | | |
|  | Fe$_2$O$_3$: 159.7 g/mol | | | | | | | |
|  | WO$_3$ 231.8 g/mol | | | | | | | |
| (C') | TeO$_2$ 159.6 g/mol | | | | | | | |
| (C") | Sb$_2$O$_3$ 291.5 g/mol | | | | | | | |

|  |  |  |  |  |  |  |  |  |
|---|---|---|---|---|---|---|---|---|
|  | Total | 100.00 | 100.01 | 100.00 | 100.00 | 100.00 | 100.00 | 100.00 |
|  | Ag$_2$O/V$_2$O$_5$ | 2.18 | 2.18 | 2.18 | 2.18 | 2.18 | 2.18 | 2.18 |
|  | Melt Temp (C.) | 600 | 700 | 700 | 700 | 700 | 700 | 700 |
|  | Tg (C.) | — | 217.8 | 140.2 | 153.26 | 151.37 | 153.72 | 151.37 |
|  | (mW) | | | | | | | |
| TC | TC1 − Tg | — | — | 49.78 | 46.14 | 48.06 | 56.42 | 36.23 |
|  | TC1 (C.) | 158 | — | 189.98 | 199.4 | 199.43 | 210.14 | 187.6 |
|  | (J/g) | 2.8 | — | 28.96 | 28.72 | 29.37 | 27.68 | 37.92 |
|  | TC2 (C.) | 250 | — | 249.97 | 340.2 | 266.12 | 311.46 | 269.88 |
|  | (J/g) | 0.63 | — | 6.4 | 7.54 | 17.97 | 9.39 | 26.4 |
|  | TC3 (C.) | | | | | | | |
|  | (J/g) | | | | | | | |
| TR | TR1 (C.) | 359 | 362.4 | 384.01 | 372.4 | 370.9 | 379 | 382.31 |
|  | (J/g) | −1.63 | −16.87 | −72.24 | −5.27 | −32.36 | −47.79 | −1.87 |
|  | TR2 (C.) | 374 | | | 382.79 | | | 410 |
|  | (J/g) | −68 | | | −14.3 | | | −83.39 |
|  | TR3 (C.) | | | | | | | |
|  | (J/g) | | | | | | | |
|  | bach size | 10 g | 10 g | 10 g | 10 g | 10 g | 10 g | 10 g |
|  | Melt pour | Good | Good | Good | Good | Good | Good | Good |

|  | mesh | Example 78 100/200 | Example 79 100/200 | Example 80 100/200 | Example 81 100/200 | Example 82 100/200 | Example 83 100/200 | Example 84 100/200 | Example 85 100/200 | Example 86 100/200 |
|---|---|---|---|---|---|---|---|---|---|---|
| (A) | Ag$_2$O: 231.7 g/mol | 68.21 | 65.81 | 68.21 | 65.81 | 61.70 | 68.21 | 65.81 | 61.70 | 58.27 |
| (B) | V$_2$O$_5$: 181.9 g/mol | 31.29 | 30.19 | 31.29 | 30.19 | 28.30 | 31.29 | 30.19 | 28.30 | 26.73 |
| (C) | MoO$_3$: 143.9 g/mol | 0.50 | 4.00 | | | | | | | |
|  | ZnO: 81.4 g/mol | | | 0.50 | 4.00 | 10.00 | | | | |
|  | CuO: 79.5 g/mol | | | | | | 0.50 | 4.00 | 10.00 | 15.00 |
|  | TiO$_2$: 79.9 g/mol | | | | | | | | | |
|  | Bi$_2$O$_3$: 466.0 g/mol | | | | | | | | | |
|  | MnO$_2$: 86.9 g/mol | | | | | | | | | |
|  | MgO: 102 g/mol | | | | | | | | | |
|  | Nb$_2$O$_5$: 265.8 g/mol | | | | | | | | | |
|  | BaO: 153.3 g/mol | | | | | | | | | |
|  | P$_2$O$_5$: 141.94 g/mol | | | | | | | | | |
| (D) | SiO$_2$: 60.1 g/mol | | | | | | | | | |
|  | Al$_2$O$_3$: 102 g/mol | | | | | | | | | |
|  | SnO: 134.7 g/mol | | | | | | | | | |
|  | Fe$_2$O$_3$: 159.7 g/mol | | | | | | | | | |
|  | WO$_3$ 231.8 g/mol | | | | | | | | | |
|  | TeO$_2$ 159.6 g/mol | | | | | | | | | |
|  | Sb$_2$O$_3$ 291.5 g/mol | | | | | | | | | |
|  | Total | 100.00 | 100.00 | 100.00 | 100.00 | 100.00 | 100.00 | 100.00 | 100.00 | 100.00 |
|  | Ag$_2$O/V$_2$O$_5$ | 2.18 | 2.18 | 2.18 | 2.18 | 2.18 | 2.18 | 2.18 | 2.18 | 2.18 |
|  | Melt Temp (C.) | 700 | 700 | 700 | 700 | 700 | 700 | 700 | 700 | 700 |
|  | Tg (C.) | | 134.55 | 123.24 | 132.95 | 140.7 | 123.39 | 143.79 | 151.76 | 163.77 |
|  | (mW) | | | | | | | | | |
| TC | TC1 − Tg | | 26.17 | 34.07 | 56.73 | 55.56 | 35 | 34.37 | 51.43 | 54.45 |
|  | TC1 (C.) | 149.09 | 160.72 | 157.31 | 189.68 | 196.26 | 158.39 | 178.16 | 203.19 | 218.22 |
|  | (J/g) | 2.2 | 26.38 | 14.42 | 36.59 | 15.34 | 9.48 | 23.06 | 39.46 | 15.97 |
|  | TC2 (C.) | | 222.63 | 306.98 | 267.06 | 255.25 | | 224.29 | 295.21 | |
|  | (J/g) | | 3.09 | 1.59 | 2.98 | 15.19 | | 10.65 | 1.39 | |
|  | TC3 (C.) | | 268.54 | | | | | 310.91 | | |
|  | (J/g) | | 3 | | | | | 3.84 | | |
| TR | TR1 (C.) | 372.61 | 362.02 | 373.14 | 364.92 | 373.3 | 373.18 | 370.77 | 370.47 | 371.13 |
|  | (J/g) | −81.43 | −65.83 | −76.99 | −62.39 | −40.15 | −70.46 | −60.36 | −47.37 | −43.46 |
|  | TR2 (C.) | | | | | 420.67 | | | | |
|  | (J/g) | | | | | −0.36 | | | | |
|  | TR3 (C.) | | | | | | | | | |
|  | (J/g) | | | | | | | | | |
|  | bach size | 10 g | 10 g | 10 g | 10 g | 10 g | 10 g | 10 g | 10 g | 10 g |
|  | Melt pour | Good | Good | Good | Good | Good | Good | Good | Good | Good |

As shown in Tables 1 and 2, the glass frits in these Examples do not contain lead (Pb), arsenic (As), tellurium (Te), or antimony (Sb), which are toxic substances. The glass frits of the Examples have a glass transition temperature (Tg) of 250° C. or lower, a crystallization temperature (Tc) of 350° C. or lower, and a crystal-remelting temperature (Tr) of 450° C. or lower. The glass frits of the Examples can be used in die attach materials, electrically conductive pastes, or sealing materials. A die attach material, electrically conductive paste, or sealing material containing the glass frits of the Examples can bond an adherend by sufficiently wetting and spreading over the interface of the adherend since the fluidity thereof at relatively low treatment temperatures (e.g., 450° C. or lower) is enhanced. A device that uses a die attach material, electrically conductive paste, or sealing material containing the glass frits of the Examples can inhibit cracking or the like that is caused by inconsistency in expansion rates between an adherend and a crystallized glass structure when, after being bonded, the device is placed under thermal cycling conditions. A die attach material, electrically conductive paste, or sealing material containing the glass frits of the Examples exhibits high thermal stress resistance and maintains high adhesion.

Tables 3 and 4 show glass frits essentially consisting of: (A) $Ag_2O$, (B) $V_2O_5$, (C-1) $MoO_3$, and (C-2) one oxide selected from the group consisting of $TiO_2$, $Bi_2O_3$, $MnO_2$, MgO, $Nb_2O_5$, BaO, and $P_2O_5$. The glass frits shown in Tables 3 and 4 were produced by a method similar to Example 1 except that the compositions shown in Tables 3 and 4 were used, and evaluated in a manner similar to Example 1.

TABLE 3

| | mesh | Example 15 100/200 | Example 16 100/200 | Example 17 100/200 | Example 18 100/200 | Example 20 100/200 | Example 21 100/200 | Example 22 100/200 |
|---|---|---|---|---|---|---|---|---|
| (A) | $Ag_2O$: 231.7 g/mol | 62.73 | 62.04 | 60.67 | 57.93 | 62.73 | 62.04 | 60.67 |
| (B) | $V_2O_5$: 181.9 g/mol | 28.77 | 28.46 | 27.83 | 26.57 | 28.77 | 28.46 | 27.83 |
| (C) | $MoO_3$: 143.9 g/mol | 7.50 | 7.50 | 7.50 | 7.50 | 7.50 | 7.50 | 7.50 |
| | ZnO: 81.4 g/mol | | | | | | | |
| | CuO: 79.5 g/mol | | | | | | | |
| | $TiO_2$: 79.9 g/mol | | | | | 1.00 | 2.00 | 4.00 |
| | $Bi_2O_3$: 466.0 g/mol | | | | | | | |
| | $MnO_2$: 66.9 g/mol | | | | | | | |
| | MgO: 102 g/mol | | | | | | | |
| | $Nb_2O_5$: 265.8 g/mol | 1.00 | 2.00 | 4.00 | 8.00 | | | |
| | BaO: 153.3 g/mol | | | | | | | |
| | $P_2O_5$: 141.94 g/mol | | | | | | | |
| (D) | $SiO_2$: 60.1 g/mol | | | | | | | |
| | $Al_2O_3$: 102 g/mol | | | | | | | |
| | SnO: 134.7 g/mol | | | | | | | |
| | $Fe_2O_3$: 159.7 g/mol | | | | | | | |
| | $WO_3$ 231.8 g/mol | | | | | | | |
| | $TeO_2$ 159.6 g/mol | | | | | | | |
| | $Sb_2O_3$ 291.5 g/mol | | | | | | | |
| | Total | 100.00 | 100.00 | 100.00 | 100.00 | 100.00 | 100.00 | 100.00 |
| | $Ag_2O/V_2O_5$ | 2.18 | 2.18 | 2.18 | 2.18 | 2.15 | 2.18 | 2.18 |
| | Melt Temp (C.) | 700 | 700 | 700 | 700 | 700 | 700 | 700 |
| | Tg (C.) | 151.47 | 156.2 | 164.63 | 174.88 | 151.03 | 151.88 | 146.91 |
| | (mW) | | | | | | | |
| TC | TC1 − Tg | 30.08 | 33.62 | 58.05 | 40.95 | 31.48 | 29.59 | 28.09 |
| | TC1 (C.) | 181.55 | 189.82 | 222.68 | 215.83 | 182.54 | 181.47 | 175 |
| | (J/g) | 33.71 | 34.2 | 35.68 | 29.72 | 33.24 | 32.04 | 32.33 |
| | TC2 (C.) | | | | | | | 286.23 |
| | (J/g) | | | | | | | 3.43 |
| | TC3 (C.) | | | | | | | |
| | (J/g) | | | | | | | |
| | TR1 (C.) | 356.6 | 338.87 | 358.4 | 359.21 | 365.31 | 365.38 | 352.87 |
| | (J/g) | −42.6 | −23.47 | 30.67 | −25.99 | −42.52 | −39.99 | −44.51 |
| | TR2 (C.) | | 396.4 | 411.03 | 416.37 | | | |
| | (J/g) | | −28.65 | −21.84 | −31.71 | | | |
| | TR3 (C.) | | | | | | | |
| | (J/g) | | | | | | | |
| | bach size | 10 g | 10 g | 10 g | 10 g | 10 g | 10 g | 10 g |
| | Melt pour | Good | Good | Good | Good | Good | Good | Good |

| | mesh | Example 23 100/200 | Example 24 100/200 | Example 25 100/200 | Example 26 100/200 | Example 27 100/200 |
|---|---|---|---|---|---|---|
| (A) | $Ag_2O$: 231.7 g/mol | 62.73 | 62.04 | 62.04 | 61.36 | 60.67 |
| (B) | $V_2O_5$: 181.9 g/mol | 28.77 | 28.46 | 28.46 | 28.14 | 27.83 |
| (C) | $MoO_3$: 143.9 g/mol | 7.50 | 7.50 | 7.50 | 7.50 | 7.50 |
| | ZnO: 81.4 g/mol | | | | | |
| | CuO: 79.5 g/mol | | | | | |
| | $TiO_2$: 79.9 g/mol | | | | | |
| | $Bi_2O_3$: 466.0 g/mol | | | | | |
| | $MnO_2$: 66.9 g/mol | | | | | |

TABLE 3-continued

|  |  |  |  |  |  |  |
|---|---|---|---|---|---|---|
|  | MgO: 102 g/mol | 1.00 | 2.00 | 2.00 | 3.00 | 4.00 |
|  | Nb$_2$O$_5$: 265.8 g/mol |  |  |  |  |  |
|  | BaO: 153.3 g/mol |  |  |  |  |  |
|  | P$_2$O$_5$: 141.94 g/mol |  |  |  |  |  |
| (D) | SiO$_2$: 60.1 g/mol |  |  |  |  |  |
|  | Al$_2$O$_3$: 102 g/mol |  |  |  |  |  |
|  | SnO: 134.7 g/mol |  |  |  |  |  |
|  | Fe$_2$O$_3$: 159.7 g/mol |  |  |  |  |  |
|  | WO$_3$ 231.8 g/mol |  |  |  |  |  |
|  | TeO$_2$ 159.6 g/mol |  |  |  |  |  |
|  | Sb$_2$O$_3$ 291.5 g/mol |  |  |  |  |  |
|  | Total | 100.00 | 100.00 | 100.00 | 100.00 | 100.00 |
|  | Ag$_2$O/V$_2$O$_5$ | 2.18 | 2.18 | 2.18 | 2.18 | 2.18 |
|  | Melt Temp (C.) | 700 | 700 | 800 | 800 | 800 |
|  | Tg (C.) | 155 | 161.86 | 161.48 | 178.6 | 190.91 |
|  | (mW) |  |  |  |  |  |
| TC | TC1 − Tg | 47.1 | 74.97 | 80.29 | 89.75 | 74.54 |
|  | TC1 (C.) | 202.1 | 236.63 | 241.75 | 268.35 | 265.45 |
|  | (J/g) | 35.58 | 45.29 | 42.52 | 37.7 | 31.58 |
|  | TC2 (C.) | 341.51 | 305.08 | 304.52 | 300.98 | 302.63 |
|  | (J/g) | 3.71 | 1.92 | 1.86 | 0.79 | 0.63 |
|  | TC3 (C.) |  |  |  |  |  |
|  | (J/g) |  |  |  |  |  |
|  | TR1 (C.) | 360.87 | 358.61 | 358.43 | 352.43 | 352.95 |
|  | (J/g) | −32.35 | 30.25 | −32.79 | −31.12 | −25.94 |
|  | TR2 (C.) | 416.32 | 410.01 | 411.02 | 400.51 | 401.27 |
|  | (J/g) | −5.98 | −4.5 | −2.76 | −5.7 | −4.12 |
|  | TR3 (C.) |  |  |  |  |  |
|  | (J/g) |  |  |  |  |  |
|  | bach size | 10 g | 10 g | 10 g | 10 g | 10 g |
|  | Melt pour | Good | Good | Good | Good | Good |

TABLE 4

|  | mesh | Example 32 100/200 | Example 33 100/200 | Example 34 100/200 | Example 35 100/200 | Example 44 100/200 | Example 45 100/200 | Example 46 100/200 | Example 47 100/200 |
|---|---|---|---|---|---|---|---|---|---|
| (A) | Ag$_2$O: 231.7 g/mol | 62.73 | 62.04 | 60.67 | 57.93 | 62.73 | 62.04 | 60.67 | 57.93 |
| (B) | V$_2$O$_5$: 181.9 g/mol | 28.77 | 28.46 | 27.83 | 26.57 | 28.77 | 28.46 | 27.83 | 26.57 |
| (C) | MoO$_3$: 143.9 g/mol | 7.50 | 7.50 | 7.50 | 7.50 | 7.50 | 7.50 | 7.50 | 7.50 |
|  | ZnO: 81.4 g/mol |  |  |  |  |  |  |  |  |
|  | CuO: 79.5 g/mol |  |  |  |  |  |  |  |  |
|  | TiO$_2$: 79.9 g/mol |  |  |  |  |  |  |  |  |
|  | Bi$_2$O$_3$: 466.0 g/mol |  |  |  |  |  |  |  |  |
|  | MnO$_2$: 86.9 g/mol | 1.00 | 2.00 | 4.00 | 8.00 |  |  |  |  |
|  | MgO: 102 g/mol |  |  |  |  |  |  |  |  |
|  | Nb$_2$O$_5$: 265.8 g/mol |  |  |  |  |  |  |  |  |
|  | BaO: 153.3 g/mol |  |  |  |  | 1.00 | 2.00 | 4.00 | 8.00 |
|  | P$_2$O$_5$: 141.94 g/mol |  |  |  |  |  |  |  |  |
| (D) | SiO$_2$: 60.1 g/mol |  |  |  |  |  |  |  |  |
|  | Al$_2$O$_3$: 102 g/mol |  |  |  |  |  |  |  |  |
|  | SnO: 134.7 g/mol |  |  |  |  |  |  |  |  |
|  | Fe$_2$O$_3$: 159.7 g/mol |  |  |  |  |  |  |  |  |
|  | WO$_3$ 231.8 g/mol |  |  |  |  |  |  |  |  |
|  | TeO$_2$ 159.6 g/mol |  |  |  |  |  |  |  |  |
|  | Sb$_2$O$_3$ 291.5 g/mol |  |  |  |  |  |  |  |  |
|  | Total | 100.00 | 100.00 | 100.00 | 100.00 | 100.00 | 100.00 | 100.00 | 100.00 |
|  | Ag$_2$O/V$_2$O$_5$ | 2.18 | 2.18 | 2.18 | 2.18 | 2.18 | 2.18 | 2.18 | 2.18 |
|  | Melt Temp (C.) | 700 | 700 | 700 | 700 | 700 | 700 | 700 | 700 |
|  | Tg (C.) | 163.5 | 151.11 | 149.39 | 173.26 | 148.19 | 151.21 | 151.27 | 153.39 |
|  | (mW) |  |  |  |  |  |  |  |  |
| TC | TC1 − Tg | 64.84 | 39.94 | 35.14 | 59.98 | 32.48 | 38.23 | 63 | 62.51 |
|  | TC1 (C.) | 228.34 | 191.05 | 184.53 | 233.24 | 180.67 | 189.44 | 214.27 | 215.9 |
|  | (J/g) | 38.46 | 34.62 | 33.9 | 38.19 | 35.61 | 36.09 | 34.74 | 23.1 |
|  | TC2 (C.) | 291.99 | 304.81 |  | 278.79 | 277.9 | 262.55 | 264.18 | 280.15 |
|  | (J/g) | 8.24 | 6.46 |  | 11.8 | 7.55 | 6.44 | 3 | 5.27 |
|  | TC3 (C.) |  |  |  |  |  |  | 300.46 |  |
|  | (J/g) |  |  |  |  |  |  | 2.13 |  |

TABLE 4-continued

|  | Example 32 | Example 33 | Example 34 | Example 35 | Example 44 | Example 45 | Example 46 | Example 47 |
|---|---|---|---|---|---|---|---|---|
| mesh | 100/200 | 100/200 | 100/200 | 100/200 | 100/200 | 100/200 | 100/200 | 100/200 |
| TR1 (C.) | 350.14 | 360.67 | 350.59 | 359.42 | 353.02 | 355.87 | 361.35 | 370.18 |
| (J/g) | −10.62 | −23.16 | −9.76 | −0.77 | −48.88 | −43.24 | −51.52 | −70.21 |
| TR2 (C.) | 408.43 | 408.57 | 370.21 | 414.75 | 387.18 |  |  |  |
| (J/g) | −19.14 | −17.71 | −15.23 | −57.55 | −5.37 |  |  |  |
| TR3 (C.) |  |  |  |  |  |  |  |  |
| (J/g) |  |  |  |  |  |  |  |  |
| bach size | 10 g | 10 g | 10 g | 10 g | 10 g | 10 g | 10 g | 10 g |
| Melt pour | Good | Good | Good | Good | Good | Good | Good | Good |

The glass frits in these Examples containing two substances in component (C) have a glass transition temperature (Tg) of 200° C. or lower, a crystallization temperature (Tc) of 350° C. or lower, and a crystal-remelting temperature (Tr) of 450° C. or lower, as shown in Tables 3 and 4. The glass frits of the Examples can be used in die attach materials, electrically conductive pastes, or sealing materials. A die attach material, electrically conductive paste, or sealing material containing the glass frits of the Examples exhibits excellent adhesion at relatively low treatment temperatures, i.e., 450° C. or lower. A device that uses a die attach material, electrically conductive paste, or sealing material containing the glass frits of the Examples exhibits high thermal stress resistance and maintains high adhesion when, after being bonded, the device is placed under thermal cycling conditions.

Tables 5 and 6 show glass frits essentially consisting of: (A) $Ag_2O$, (B) $V_2O_5$, (C-1) $MoO_3$, and (C-2) ZnO. The glass frits shown in Tables 5 and 6 were produced by a method similar to Example 1 except that the compositions shown in Tables 5 and 6 were used, and evaluated in a manner similar to Example 1.

TABLE 5

|  |  | Example 36 | Example 37 | Example 38 | Example 39 | Example 48 | Example 49 | Example 50 | Example 51 | Example 52 | Example 53 | Example 54 |
|---|---|---|---|---|---|---|---|---|---|---|---|---|
|  | mesh | 100/200 | 100/200 | 100/200 | 100/200 | 100/200 | 100/200 | 100/200 | 100/200 | 100/200 | 100/200 | 100/200 |
| (A) | $Ag_2O$: 231.7 g/mol | 62.73 | 62.04 | 60.67 | 57.93 | 56.56 | 55.19 | 64.44 | 63.07 | 58.96 | 60.33 | 56.21 |
| (B) | $V_2O_5$: 181.9 g/mol | 28.77 | 28.46 | 27.83 | 26.57 | 25.94 | 25.31 | 29.56 | 28.93 | 27.04 | 27.67 | 25.79 |
| (C) | $MoO_3$: 143.9 g/mol | 7.50 | 7.50 | 7.50 | 7.50 | 7.50 | 7.50 | 4.00 | 4.00 | 10.00 | 4.00 | 10.00 |
|  | ZnO: 81.4 g/mol | 1.00 | 2.00 | 4.00 | 8.00 | 10.00 | 12.00 | 2.00 | 4.00 | 4.00 | 8.00 | 8.00 |
|  | CuO: 79.5 g/mol |  |  |  |  |  |  |  |  |  |  |  |
|  | $TiO_2$: 79.9 g/mol |  |  |  |  |  |  |  |  |  |  |  |
|  | $Bi_2O_3$: 466.0 g/mol |  |  |  |  |  |  |  |  |  |  |  |
|  | $MnO_2$: 86.9 g/mol |  |  |  |  |  |  |  |  |  |  |  |
|  | MgO: 102 g/mol |  |  |  |  |  |  |  |  |  |  |  |
|  | $Nb_2O_5$: 26.58 g/mol |  |  |  |  |  |  |  |  |  |  |  |
|  | BaO: 153.3 g/mol |  |  |  |  |  |  |  |  |  |  |  |
|  | $P_2O_5$: 141.94 g/mol |  |  |  |  |  |  |  |  |  |  |  |
| (D) | $SiO_2$: 60.1 g/mol |  |  |  |  |  |  |  |  |  |  |  |
|  | $Al_2O_3$: 102 g/mol |  |  |  |  |  |  |  |  |  |  |  |
|  | SnO: 134.7 g/mol |  |  |  |  |  |  |  |  |  |  |  |
|  | $Fe_2O_3$: 159.7 g/mol |  |  |  |  |  |  |  |  |  |  |  |
|  | $WO_3$ 231.8 g/mol |  |  |  |  |  |  |  |  |  |  |  |
|  | $TeO_2$ 159.6 g/mol |  |  |  |  |  |  |  |  |  |  |  |
|  | $Sb_2O_3$ 291.5 g/mol |  |  |  |  |  |  |  |  |  |  |  |
|  | Total | 100.00 | 100.00 | 100.00 | 100.00 | 100.00 | 100.00 | 100.00 | 100.00 | 100.00 | 100.00 | 100.00 |
|  | $Ag_2O/V_2O_5$ | 2.18 | 2.18 | 2.18 | 2.18 | 2.18 | 2.18 | 2.18 | 2.18 | 2.18 | 2.18 | 2.18 |
|  | Melt Temp (C.) | 700 | 700 | 700 | 700 | 700 | 700 | 700 | 700 | 700 | 700 | 700 |
|  | Tg (C.) | 149.23 | 150.62 | 154.03 | 160.2 | 159.5 | 161.63 | 139.87 | 144.69 | 161.12 | 152.74 | 167.88 |
|  | (mW) |  |  |  |  |  |  |  |  |  |  |  |
| TC | TC1 − Tg | 32.93 | 44.84 | 71.72 | 80 | 68.09 | 62.27 | 53.06 | 62.29 | 73.97 | 64.16 | 87.11 |
|  | TC1 (C.) | 182.16 | 195.46 | 225.75 | 240.2 | 227.59 | 223.9 | 192.93 | 206.98 | 235.09 | 216.9 | 254.99 |
|  | (J/g) | 37.56 | 38.61 | 43.22 | 50.58 | 36.72 | 34.59 | 32.42 | 42.24 | 47.74 | 37.15 | 51.86 |
|  | TC2 (C.) |  |  | 294.36 | 297.88 | 256.23 | 254.12 | 305.78 | 303.17 |  | 265.45 | 295.49 |
|  | (J/g) |  |  | 2.94 | 0.96 | 2.48 | 3.46 | 11.77 | 2.09 |  | 3.54 | 0.91 |
|  | TC3 (C.) |  |  |  |  | 287.23 |  |  |  |  |  |  |
|  | (J/g) |  |  |  |  | 0.53 |  |  |  |  |  |  |
| TR | TR1 (C.) | 341.45 | 352.09 | 342.08 | 342.74 | 341.67 | 341.61 | 352.7 | 343.64 | 341.49 | 351.75 | 342.31 |
|  | (J/g) | −43.54 | −37.77 | −46.48 | −38.36 | −31.46 | −31.1 | −68.62 | −66.86 | −43.66 | −54.15 | −78.99 |
|  | TR2 (C.) |  |  | 384.15 |  |  |  |  |  |  |  |  |
|  | (J/g) |  |  | −15.98 |  |  |  |  |  |  |  |  |
|  | TR3 (C.) |  |  |  |  |  |  |  |  |  |  |  |
|  | (J/g) |  |  |  |  |  |  |  |  |  |  |  |
|  | bach size | 10 g | 10 g | 10 g | 10 g | 10 g | 10 g | 10 g | 10 g | 10 g | 10 g | 10 g |
|  | Melt pour | Good | Good | Good | Good | Good | Good | Good | Good | Good | Good | Good |

TABLE 6

|  |  | Example 55 | Example 56 | Example 87 | Example 88 | Example 89 | Example 90 | Example 91 | Example 92 | Example 93 | Example 94 |
|---|---|---|---|---|---|---|---|---|---|---|---|
|  | mesh | 100/200 | 100/200 | 100/200 | 100/200 | 100/200 | 100/200 | 100/200 | 100/200 | 100/200 | 100/200 |
| (A) | $Ag_2O$: 231.7 g/mol | 54.84 | 54.84 | 52.71 | 59.22 | 62.48 | 59.22 | 62.48 | 63.78 | 64.55 | 54.20 |
| (B) | $V_2O_5$: 181.9 g/mol | 25.16 | 25.16 | 29.29 | 22.78 | 19.52 | 22.78 | 19.52 | 18.22 | 17.45 | 27.80 |
| (C) | $MoO_3$: 143.9 g/mol | 12.00 | 10.00 | 10.00 | 10.00 | 10.00 | 10.00 | 10.00 | 10.00 | 10.00 | 10.00 |
|  | ZnO: 81.4 g/mol | 8.00 | 10.00 | 8.00 | 8.00 | 8.00 | 8.00 | 8.00 | 8.00 | 8.00 | 8.00 |
|  | CuO: 79.5 g/mol |  |  |  |  |  |  |  |  |  |  |
|  | $TiO_2$: 79.9 g/mol |  |  |  |  |  |  |  |  |  |  |
|  | $Bi_2O_3$: 466.0 g/mol |  |  |  |  |  |  |  |  |  |  |
|  | $MnO_2$: 86.9 g/mol |  |  |  |  |  |  |  |  |  |  |
|  | MgO: 102 g/mol |  |  |  |  |  |  |  |  |  |  |
|  | $Nb_2O_5$: 265.8 g/mol |  |  |  |  |  |  |  |  |  |  |
|  | BaO: 153.3 g/mol |  |  |  |  |  |  |  |  |  |  |
|  | $P_2O_5$: 141.94 g/mol |  |  |  |  |  |  |  |  |  |  |
| (D) | $SiO_2$: 60.1 g/mol |  |  |  |  |  |  |  |  |  |  |
|  | $Al_2O_3$: 102 g/mol |  |  |  |  |  |  |  |  |  |  |
|  | SnO: 134.7 g/mol |  |  |  |  |  |  |  |  |  |  |
|  | $Fe_2O_3$: 159.7 g/mol |  |  |  |  |  |  |  |  |  |  |
|  | $WO_3$ 231.8 g/mol |  |  |  |  |  |  |  |  |  |  |
| (C') | $TeO_2$ 159.6 g/mol |  |  |  |  |  |  |  |  |  |  |
| (C") | $Sb_2O_3$ 291.5 g/mol |  |  |  |  |  |  |  |  |  |  |
|  | Total | 100.00 | 100.00 | 100.00 | 100.00 | 100.00 | 100.00 | 100.00 | 100.00 | 100.00 | 100.00 |
|  | $Ag_2O/V_2O_5$ | 2.18 | 2.18 | 1.80 | 2.60 | 3.20 | 2.60 | 3.20 | 3.50 | 3.70 | 1.95 |
|  | Melt Temp (C.) | 700 | 700 | 700 | 700 | 700 | 700 | 700 | 700 | 700 | 700 |
|  | Tg (C.) | 172.5 | 172.55 | 181.2 | 159.75 | 145.97 | 161.15 | 145.28 | — | — | 178.12 |
|  | (mW) |  |  |  |  |  |  |  |  |  |  |
| TC | TC1 − Tg | 75.21 | 77.05 | 70.15 | 54.44 | 41.31 | 54.52 | 39.54 | — | — | 76.15 |
|  | TC1 (C.) | 247.71 | 249.6 | 251.35 | 214.19 | 187.28 | 215.67 | 184.82 | 172.62 | 191.98 | 254.27 |
|  | (J/g) | 48.32 | 43.24 | 56.01 | 43.62 | 12.25 | 41.78 | 13.09 | 1.33 |  | 52.33 |
|  | TC2 (C.) |  | 296.09 |  | 313.91 | 267.61 | 313.85 | 262.41 | 288.41 | 285.58 | 296.64 |
|  | (J/g) |  | 0.6 |  | 7.22 | 3.12 | 7.49 | 3.2 | 11.38 | 10.03 | 0.27 |
|  | TC3 (C.) |  |  |  |  | 290.06 |  | 290.39 |  |  |  |
|  | (J/g) |  |  |  |  | 8.74 |  | 8.6 |  |  |  |
| TR | TR1 (C.) | 340.27 | 343.32 | 340.61 | 344.55 | 416.17 | 344.89 | 360.98 | 360.21 | 360.33 | 341.05 |
|  | (J/g) | −9.18 | −18.52 | −15.98 | −32.06 | −7.09 | −33.99 | −19.66 | −14.51 | −14.05 | −38.08 |
|  | TR2 (C.) | 365.31 | 367.48 |  |  | 460.79 |  | 416.67 | 416.42 | 416.28 |  |
|  | (J/g) | −2.86 | −1.46 |  |  | −18.47 |  | −5.52 | −11.04 | −12.76 |  |
|  | TR3 (C.) | 391.02 | 392.78 |  |  |  |  | 459.97 | 461.24 | 460.27 |  |
|  | (J/g) | −26.93 | −10.72 |  |  |  |  | −32.07 | −27.33 | −24.18 |  |
|  | bach size | 10 g | 10 g | 10 g | 10 g | 10 g | 10 g | 10 g | 10 g | 10 g | 10 g |
|  | Melt pour | Good | Good | Good | Good | Good | Good | Good | Good | Good | Good |

Table 7 shows glass frits essentially consisting of: (A) $Ag_2O$, (B) $V_2O_5$, (C-1) $MoO_3$, and (C-2) CuO. The glass frits shown in Table 7 were produced by a method similar to Example 1 except that the compositions shown in Table 7 were used, and evaluated in a manner similar to Example 1.

TABLE 7

|  |  | Example 40 | Example 41 | Example 42 | Example 43 | Example 57 | Example 58 | Example 59 | Example 60 | Example 61 | Example 62 |
|---|---|---|---|---|---|---|---|---|---|---|---|
|  | mesh | 100/200 | 100/200 | 100/200 | 100/200 | 100/200 | 100/200 | 100/200 | 100/200 | 100/200 | 100/200 |
| (A) | $Ag_2O$: 231.7 g/mol | 62.73 | 62.04 | 60.67 | 57.93 | 56.56 | 55.19 | 63.07 | 60.33 | 58.96 | 56.21 |
| (B) | $V_2O_5$: 181.93 /mol | 28.77 | 28.46 | 27.83 | 26.57 | 25.94 | 25.31 | 28.93 | 27.67 | 27.04 | 25.79 |
| (C) | $MoO_3$: 143.9 g/mol | 7.50 | 7.50 | 7.50 | 7.50 | 7.50 | 7.50 | 4.00 | 4.00 | 10.00 | 10.00 |
|  | ZnO: 81.4 g/mol |  |  |  |  |  |  |  |  |  |  |
|  | CuO: 79.5 g/mol | 1.00 | 2.00 | 4.00 | 8.00 | 10.00 | 12.00 | 4.00 | 8.00 | 4.00 | 8.00 |
|  | $TiO_2$: 79.9 g/mol |  |  |  |  |  |  |  |  |  |  |
|  | $Bi_2O_3$: 466.0 g/mol |  |  |  |  |  |  |  |  |  |  |
|  | $MnO_2$: 86.9 g/mol |  |  |  |  |  |  |  |  |  |  |
|  | MgO: 102 g/mol |  |  |  |  |  |  |  |  |  |  |
|  | $Nb_2O_5$: 265.8 g/mol |  |  |  |  |  |  |  |  |  |  |
|  | BaO: 153.3 g/mol |  |  |  |  |  |  |  |  |  |  |
|  | $P_2O_5$: 141.94 g/mol |  |  |  |  |  |  |  |  |  |  |

TABLE 7-continued

|  | | Example 40 100/200 | Example 41 100/200 | Example 42 100/200 | Example 43 100/200 | Example 57 100/200 | Example 58 100/200 | Example 59 100/200 | Example 60 100/200 | Example 61 100/200 | Example 62 100/200 |
|---|---|---|---|---|---|---|---|---|---|---|---|
| | mesh | | | | | | | | | | |
| (D) | $SiO_2$: 60.1 g/mol | | | | | | | | | | |
| | $Al_2O_3$: 102 g/mol | | | | | | | | | | |
| | SnO: 134.7 g/mol | | | | | | | | | | |
| | $Fe_2O_3$: 159.7 g/mol | | | | | | | | | | |
| | $WO_2$ 231.8 g/mol | | | | | | | | | | |
| | $TeO_2$ 159.6 g/mol | | | | | | | | | | |
| | $Sb_2O_3$ 291.5 g/mol | | | | | | | | | | |
| | Total | 100.00 | 100.00 | 100.00 | 100.00 | 100.00 | 100.00 | 100.00 | 100.00 | 100.00 | 100.00 |
| | $Ag_2O/V_2O_5$ | 2.18 | 2.18 | 2.18 | 2.18 | 2.18 | 2.18 | 2.18 | 2.18 | 2.18 | 2.18 |
| | Melt Temp (C.) | 700 | 700 | 700 | 700 | 700 | 700 | 700 | 700 | 700 | 700 |
| | Tg (C.) | 149.29 | 152.33 | 158 | 172.43 | 183.48 | 192.46 | 151.38 | 164.95 | 165.03 | 178.92 |
| | (mW) | | | | | | | | | | |
| TC | TC1 − Tg | 33.29 | 44.46 | 70.15 | 57.27 | 46.72 | 44.35 | 70.54 | 57.67 | 64.24 | 53 |
| | TC1 (C.) | 182.58 | 196.79 | 228.15 | 229.7 | 230.2 | 236.81 | 221.92 | 222.62 | 229.27 | 231.92 |
| | (J/g) | 36.42 | 42.29 | 47.53 | 43.32 | 41.26 | 41.27 | 40.22 | 35.13 | 43.21 | 46.67 |
| | TC2 (C.) | | 290.65 | 295.55 | | | 329.85 | | 303.81 | | 324.8 |
| | (J/g) | | 2.33 | 0.49 | | | 4.45 | | 2.13 | | 7.95 |
| | TC3 (C.) | | | | | | | | | | |
| | (J/g) | | | | | | | | | | |
| | TR1 (C.) | 351.22 | 358.64 | 348.37 | 352.24 | 346.22 | 409.64 | 350.22 | 348.8 | 355.99 | 412.74 |
| | (J/g) | −43.45 | −37.33 | −21.99 | −13.67 | −5.07 | −40.55 | −52.54 | −52.55 | −8.19 | −73.51 |
| | TR2 (C.) | | | 406.63 | 406.49 | 409.16 | 423.74 | | | 408.98 | |
| | (J/g) | | | −32.14 | −36.61 | −67.55 | −3.5 | | | −65.79 | |
| | TR3 (C.) | | | | | | | | | | |
| | (J/g) | | | | | | | | | | |
| | bach size | 10 g | 10 g | 10 g | 10 g | 10 g | 10 g | 10 g | 10 g | 10 g | 10 g |
| | Melt pour | Good | Good | Good | Good | Good | Good | Good | Good | Good | Good |

Table 8 shows glass frits essentially consisting of: (A) $Ag_2O$, (B) $V_2O_5$, (C-1) ZnO, and (C-2) CuO. The glass fits shown in Table 8 were produced by a method similar to Example 1 except that the compositions shown in Table 8 were used, and evaluated in a manner similar to Example 1.

TABLE 8

|  | | Example 73 100/200 | Example 74 100/200 | Example 75 100/200 | Example 76 100/200 |
|---|---|---|---|---|---|
| | mesh | | | | |
| (A) | $Ag_2O$: 231.7 g/mol | 64.44 | 63.07 | 60.33 | 57.58 |
| (B) | $V_2O_5$: 181.9 g/mol | 20.56 | 28.93 | 27.67 | 26.42 |
| (C) | $MoO_3$: 143.9 g/mol | | | | |
| | ZnO: 81.4 g/mol | 2.00 | 4.00 | 8.00 | 8.00 |
| | CuO: 79.5 g/mol | 4.00 | 4.00 | 4.00 | 8.00 |
| | $TiO_2$: 79.9 g/mol | | | | |
| | $Bi_2O_3$: 466.0 g/mol | | | | |
| | $MnO_2$: 86.9 g/mol | | | | |
| | MgO: 102 g/mol | | | | |
| | $Nb_2O_5$: 265.8 g/mol | | | | |
| | BaO: 153.3 g/mol | | | | |
| | $P_2O_5$: 141.94 g/mol | | | | |
| (D) | $SiO_2$: 60.1 g/mol | | | | |
| | $Al_2O_3$: 102 g/mol | | | | |
| | SnO: 134.7 g/mol | | | | |
| | $Fe_2O_3$: 159.7 g/mol | | | | |
| | $WO_3$ 231.8 g/mol | | | | |
| | $TeO_2$ 159.6 g/mol | | | | |
| | $Sb_2O_3$ 291.5 g/mol | | | | |
| | Total | 100.00 | 100.00 | 100.00 | 100.00 |
| | $Ag_2O/V_2O_5$ | 2.18 | 2.18 | 2.18 | 2.18 |
| | Melt Temp (C.) | 700 | 700 | 700 | 700 |
| | Tg (C.) | 150.38 | 151.41 | 159.48 | — |
| | (mW) | | | | |
| TC | TC1 − Tg | 43.97 | 38.06 | 38.08 | |
| | TC1 (C.) | 194.35 | 189.47 | 197.56 | 215.65 |
| | (J/g) | 22.68 | 25.43 | 18.63 | 1.49 |
| | TC2 (C.) | 242.19 | 225.65 | 220.06 | 294.39 |
| | (J/g) | 11.08 | 8.61 | 3.54 | 2.2 |
| | TC3 (C.) | 287.92 | | 273.63 | |
| | (J/g) | 1.35 | | 4.22 | |
| TR | TR1 (C.) | 369.78 | 367.47 | 372.99 | 365.4 |
| | (J/g) | −52.73 | −50.54 | −31.01 | −1.34 |
| | TR2 (C.) | | | | 374.58 |
| | (J/g) | | | | −21.15 |
| | TR3 (C.) | | | | |
| | (J/g) | | | | |
| | bach size | 10 g | 10 g | 10 g | 10 g |
| | Melt pour | Good | Good | Good | Good |

As shown in Tables 5 to 8, the glass frits in these Examples containing (A) $Ag_2O$, (B) $V_2O_5$, and two substances in component (C) selected from $MoO_3$ and ZnO, $MoO_3$ and CuO, or ZnO and CuO have a glass transition temperature (Tg) of 200° C. or lower, a crystallization temperature (Tc) of 350° C. or lower, and a crystal-remelting temperature (Tr) of 465° C. or lower. The glass frits of the Examples can be used in die attach materials, electrically conductive pastes, or sealing materials. A die attach material, electrically conductive paste, or sealing material containing the glass frits of the Examples can bond an adherend at relatively low treatment temperatures, e.g., 465° C. or lower, for example. A device that uses a die attach material, electrically conductive paste, or sealing material containing the glass frits of the Examples exhibits high thermal stress resistance and maintains high adhesion when, after being bonded, the device is placed under thermal cycling conditions.

Table 9 shows glass frits essentially consisting of: (A) Ag$_2$O, (B) V$_2$O$_5$, (C-1) MoO$_3$, and (C-2) ZnO, where the component (A) content is 50 to 65% by mass, the component (B) content is 15 to 30% by mass, the component (C-1) content is 0 to 12% by mass, and the component (C-2) content is 0 to 12% by mass.

can bond an adherend at relatively low treatment temperatures, e.g., 465° C. or lower. A device that uses a die attach material, electrically conductive paste, or sealing material containing the glass frits of the Examples exhibits high thermal stress resistance and maintains high adhesion when,

TABLE 9

| | | | MoO$_3$ | | | | | |
|---|---|---|---|---|---|---|---|---|
| | | | 0 | 0.5 | 4 | 7.5 | 10 | 12 |
| ZnO | 0 | melt | — | Example 78 (SC300-4) | Example 79 (SC301-4) | Example 1 (SC112-4) | — | — |
| | | Tg | | | 135 | 147 | | |
| | | Tc | | 149.1  2.2 | 161  26.4 | 173  31 | | |
| | | Tr | | 372.6  −66 | 362  −66 | 355  −35 | | |
| | | | | Good | Good | Good | | |
| | 0.5 | melt | Example 80 (SC305-4) | — | — | — | — | — |
| | | Tg | 123.24 | | | | | |
| | | Tc | 157  14.4 | | | | | |
| | | Tr | 376  −70 | | | | | |
| | | | Good | | | | | |
| | 1 | melt | — | — | — | Example 36 (SC140-4) | — | — |
| | | Tg | | | | 149 | | |
| | | Tc | | | | 183  38 | | |
| | | Tr | | | | 342  −44 | | |
| | | | | | | Good | | |
| | 2 | melt | — | — | — | Example 37 (SC141-4) | — | — |
| | | Tg | | | | 151 | | |
| | | Tc | | | | 195  39 | | |
| | | Tr | | | | 352  −38 | | |
| | | | | | | Good | | |
| | 4 | melt | Example 5 (SC114-4) | — | Example 51 (SC181-4) | Example 38 (SC142-4) | Example 52 (SC183-4) | — |
| | | Tg | 134 | | 145 | 154 | 161 | |
| | | Tc | 190  40 | | 206  42 | 226  43 | 235  48 | |
| | | Tr | 366  −62 | | 343  −67 | 342  −46 | 342  −44 | |
| | | | Good | | Good | Good | Good | |
| | 8 | melt | Example 6 (SC160-4) | — | Example 53 (SC182-4) | Example 39 (SC143-4) | Example 54 (SC184-4) | Example 55 (SC223-4) |
| | | Tg | 137 | | 153 | 160 | 168 | 173 |
| | | Tc | 183  18 | | 217  37 | 240  51 | 254  52 | 248  48 |
| | | Tr | 372  −47 | | 352  −54 | 343  −38 | 342  −79 | 340  −100 |
| | | | Good | | Good | Good | Good | Good |
| | 10 | melt | Example 82 (SC307-4) | — | — | Example 48 (SC176-4) | Example 56 (SC226-4) | — |
| | | Tg | 140.74 | | | 160 | 173 | |
| | | Tc | 196  15.3 | | | 228  37 | 250  43 | |
| | | Tr | 373  −40 | | | 342  −31 | 343 | |
| | | | Good | | | Good | Good | |
| | 12 | melt | — | — | — | Example 49 (SC177-4) | — | — |
| | | Tg | | | | 162 | | |
| | | Tc | | | | 224  35 | | |
| | | Tr | | | | 342  −31 | | |
| | | | | | | Good | | |

As shown in Table 9, the glass frits essentially consisting of (A) Ag$_2$O, (B) V$_2$O$_5$, (C-1) MoO$_3$, and (C-2) ZnO have a glass transition temperature (Tg) of 180° C. or lower, a crystallization temperature (Tc) of 350° C. or lower, and a crystal-remelting temperature (Tr) of 465° C. or lower. The glass frits in these Examples can be used in die attach materials, electrically conductive pastes, or sealing materials. A die attach material, electrically conductive paste, or sealing material containing the glass frits of the Examples after being bonded, the device is placed under thermal cycling conditions.

Table 10 shows glass frits essentially consisting of: (A) Ag$_2$O, (B) V$_2$O$_5$, (C-1) MoO$_3$, and (C-2) CuO, where the component (A) content is 50 to 65% by mass, the component (B) content is 15 to 30% by mass, the component (C-1) content is 0 to 10% by mass, and the component (C-2) content is 0 to 12% by mass.

TABLE 10

| | | | MoO₃ | | | |
|---|---|---|---|---|---|---|
| | | 0 | 0.5 | 4 | 7.5 | 10 |
| CuO | 0 melt | — | Example 78 (SC300-4) | Example 79 (SC301-4) | Example 1 (SC112-4) | — |
| | Tg | | — | 135 | 147 | |
| | Tc | | 149   2.2 | 161   26.4 | 173   31 | |
| | Tr | | 373  −66 | 362  −66 | 355  −35 | |
| | | | Good | Good | Good | |
| | 0.5 melt | Example 83 (SC310-4) | — | — | — | — |
| | Tg | 123 | | | | |
| | Tc | 158   9.48 | | | | |
| | Tr | 376  −70 | | | | |
| | | Good | | | | |
| | 1 melt | — | — | — | Example 40 (SC144-4) | — |
| | Tg | | | | 149 | |
| | Tc | | | | 183   36 | |
| | Tr | | | | 351  −43 | |
| | | | | | Good | |
| | 2 melt | — | — | — | Example 41 (SC145-4) | — |
| | Tg | | | | 152 | |
| | Tc | | | | 197   42 | |
| | Tr | | | | 359  −37 | |
| | | | | | Good | |
| | 4 melt | Example 84 (SC311-4) | — | Example 59 (SC185-4) | Example 42 (SC146-4) | — |
| | Tg | 144 | | 151 | 158 | |
| | Tc | 178   23 | | 222   40 | 228   48 | |
| | Tr | 370  −60 | | 350  −53 | 348  −22 | |
| | | Good | | Good | Good | |
| | 8 melt | Example 4 (SC159-4) | — | Example 60 (SC186-4) | Example 43 (SC147-4) | Example 62 (SC188-4) |
| | Tg | 158 | | 165 | 172 | 179 |
| | Tc | 213   31 | | 223   35 | 230   43 | 232   47 |
| | Tr | 371  −46 | | 349  −53 | 406  −37 | 413  −73 |
| | | Good | | Good | Good | Good |
| | 10 melt | Example 85 (SC312-4) | — | — | Example 57 (SC178-4) | — |
| | Tg | 151 | | | 230 | |
| | Tc | 203   51 | | | 230   41 | |
| | Tr | 370  −47 | | | 409  −68 | |
| | | Good | | | Good | |
| | 12 melt | — | — | — | Example 58 (SC1794) | — |
| | Tg | | | | 192 | |
| | Tc | | | | 237   41 | |
| | Tr | | | | 410  −41 | |
| | | | | | Good | |

As shown in Table 10, the glass frits essentially consisting of (A) $Ag_2O$, (B) $V_2O_5$, (C-1) $MoO_3$, and (C-2) CuO have a glass transition temperature (Tg) of 200° C. or lower, a crystallization temperature (Tc) of 350° C. or lower, and a crystal-remelting temperature (Tr) of 450° C. or lower. The glass frits of these Examples can be used in die attach materials, electrically conductive pastes, or sealing materials. A die attach material, electrically conductive paste, or sealing material containing the glass frits of the Examples can bond an adherend at relatively low treatment temperatures, i.e., 450° C. or lower. A device that uses a die attach material, electrically conductive paste, or sealing material containing the glass frits of the Examples exhibits high thermal stress resistance and maintains high adhesion when, after being bonded, the device is placed under thermal cycling conditions.

Table 10 shows glass frits essentially consisting of: (A) $Ag_2O$, (B) $V_2O_5$, (C-1) $MoO_3$, (C-2) ZnO, and (C-3) CuO. The glass frits were produced by a method similar to Example 1 except that the compositions shown in Table 11 were used, and evaluated in a manner similar to Example 1.

TABLE 11

| | | Example 68 | Example 69 | Example 70 | Example 71 | Example 72 | Example 95 |
|---|---|---|---|---|---|---|---|
| | mesh | 100/200 | 100/200 | 100/200 | 100/200 | 100/200 | 100/200 |
| (A) | $Ag_2O$: 231.7 g/mol | 60.67 | 59.30 | 59.30 | 57.93 | 55.19 | 53.47 |
| (B) | $V_2O_5$: 181.9 g/mol | 27.83 | 27.20 | 27.20 | 26.57 | 25.31 | 24.53 |

TABLE 11-continued

| mesh | Example 68 100/200 | Example 69 100/200 | Example 70 100/200 | Example 71 100/200 | Example 72 100/200 | Example 95 100/200 |
|---|---|---|---|---|---|---|
| (C) $MoO_3$: 143.9 g/mol | 7.50 | 7.50 | 7.50 | 7.50 | 7.50 | 10.00 |
| ZnO: 81.4 g/mol | 2.00 | 2.00 | 4.00 | 4.00 | 8.00 | 8.00 |
| CuO: 79.5 g/mol | 2.00 | 4.00 | 2.00 | 4.00 | 4.00 | 4.00 |
| $TiO_2$: 79.9 g/mol | | | | | | |
| $Bi_2O_3$: 466.0 g/mol | | | | | | |
| $MnO_2$: 86.9 g/mol | | | | | | |
| MgO: 102 g/mol | | | | | | |
| $Nb_2O_5$: 265.8 g/mol | | | | | | |
| BaO: 153.3 g/mol | | | | | | |
| $P_2O_5$: 141.94 g/mol | | | | | | |
| (D) $SiO_2$: 60.1 g/mol | | | | | | |
| $Al_2O_3$: 102 g/mol | | | | | | |
| SnO: 134.7 g/mol | | | | | | |
| $Fe_2O_3$: 159.7 g/mol | | | | | | |
| $WO_3$ 231.8 g/mol | | | | | | |
| $TeO_2$ 159.6 g/mol | | | | | | |
| $Sb_2O_3$ 291.5 g/mol | | | | | | |
| Total | 100.00 | 100.00 | 100.00 | 100.00 | 100.00 | 100.00 |
| $Ag_2O/V_2O_5$ | 2.18 | 2.18 | 2.18 | 2.18 | 2.18 | 2.18 |
| Melt Temp (C.) | 700 | 700 | 700 | 700 | 700 | 700 |
| Tg (C.) | 157.81 | 162.98 | 164.41 | 167.4 | 181.31 | 190.51 |
| (mW) | | | | | | |
| TC  TC1 − Tg | 67.95 | 55.02 | 60.96 | 52.58 | 43.58 | 34.36 |
| TC1 (C.) | 225.76 | 218 | 225.37 | 219.98 | 224.89 | 224.87 |
| (J/g) | 42.76 | 43.37 | 41.68 | 40.71 | 33.97 | 30.34 |
| TC2 (C.) | 298.82 | | 301.36 | 321.83 | 254.53 | 309.65 |
| (J/g) | 1.23 | | 0.7 | 3.96 | 1.38 | 19.27 |
| TC3 (C.) | | | | | 325.99 | |
| (J/g) | | | | | 3.87 | |
| TR  TR1 (C.) | 346.83 | 345 | 345.18 | 342.85 | 341.92 | 404.58 |
| (J/g) | −32.33 | −28.51 | −36.83 | −27.53 | −23.07 | −18.57 |
| TR2 (C.) | | 401.14 | 395.22 | 400.09 | 388.34 | |
| (J/g) | | | −20.98 | −21.75 | −2.2 | |
| TR3 (C.) | | | | | 418.71 | |
| (J/g) | | | | | −3.01 | |
| bach size | 10 g | 10 g | 10 g | 10 g | 10 g | 10 g |
| Melt pour | Good | Good | Good | Good | Good | Good |

As shown in Table 11, the glass frits of these Examples containing three substances in component (C) have a glass transition temperature (Tg) of 200° C. or lower, a crystallization temperature (Tc) of 350° C. or lower, and a crystal-remelting temperature (Tr) of 450° C. or lower. The glass frits of the Examples can be used in die attach materials, electrically conductive pastes, or sealing materials. A die attach material, electrically conductive paste, or sealing material containing the glass frits of the Examples can bond an adherend at relatively low treatment temperatures of 450° C. or lower. A device that uses a die attach material, electrically conductive paste, or sealing material containing the glass frits of the Examples exhibits high thermal stress resistance and maintains high adhesion when, after being bonded, the device is placed under thermal cycling conditions.

Table 12 shows glass frits essentially consisting of: (A) $Ag_2O$, (B) $V_2O_5$, (C) $MoO_3$, (D) at least one oxide selected from the group consisting of $SiO_2$, $Al_2O_3$, SnO, $WO_3$, and $Fe_2O_3$. The glass frits were produced by a method similar to Example 1 except that the compositions shown in Table 12 were used, and evaluated in a manner similar to Example 1.

TABLE 12

| mesh | Example 14 100/200 | Example 19 100/200 | Example 28 100/200 | Example 29 100/200 | Example 30 100/200 | Example 31 100/200 | Example 63 100/200 |
|---|---|---|---|---|---|---|---|
| (A) $Ag_2O$: 231.7 g/mol | 62.73 | 62.73 | 62.73 | 62.04 | 60.67 | 57.93 | 64.78 |
| (B) $V_2O_5$: 181.9 g/mol | 28.77 | 28.77 | 28.77 | 28.46 | 27.83 | 26.57 | 29.72 |
| (C) $MoO_3$: 143.9 g/mol | 7.50 | 7.50 | 7.50 | 7.50 | 7.50 | 7.50 | 5.00 |
| ZnO: 81.4 g/mol | | | | | | | |
| CuO: 79.5 g/mol | | | | | | | |
| $TiO_2$: 79.9 g/mol | | | | | | | |
| $Bi_2O_3$: 466.0 g/mol | | | | | | | |
| $MnO_2$: 86.9 g/mol | | | | | | | |
| MgO: 102 g/mol | | | | | | | |
| $Nb_2O_5$: 265.8 g/mol | | | | | | | |
| BaO: 153.3 g/mol | | | | | | | |
| $P_2O_5$: 141.94 g/mol | | | | | | | |

TABLE 12-continued

| | | | | | | | | |
|---|---|---|---|---|---|---|---|---|
| (D) | SiO$_2$: 60.1 g/mol | | 1.00 | | | | | |
| | Al$_2$O$_3$: 102 g/mol | | | | | | | 0.50 |
| | SnO: 134.7 g/mol | 1.00 | | | | | | |
| | Fe$_2$O$_3$: 159.7 g/mol | | | 1.00 | 2.00 | 4.00 | 8.00 | |
| | WO$_3$ 231.8 g/mol | | | | | | | |
| | TeO$_2$ 159.6 g/mol | | | | | | | |
| | Sb$_2$O$_3$ 291.5 g/mol | | | | | | | |
| | Total | 100.00 | 100.00 | 100.00 | 100.00 | 100.00 | 100.00 | 100.00 |
| | Ag$_2$O/V$_2$O$_5$ | 2.18 | 2.18 | 2.18 | 2.18 | 2.18 | 2.18 | 2.18 |
| | Melt Temp (C.) | 700 | 700 | 700 | 700 | 700 | 700 | 600 |
| | Tg(C.) | 149.4 | 147.17 | 153.5 | 158.26 | 158.86 | 163.56 | 141.62 |
| | (mW) | | | | | | | |
| TC | TC1 − Tg | 23.99 | 25.96 | 26.05 | 51.2 | 49.98 | 37.8 | 27.7 |
| | TC1 (C.) | 173.39 | 173.12 | 179.55 | 209.46 | 208.84 | 201.36 | 169.32 |
| | (J/g) | 33.67 | 31.03 | 35.38 | 36.43 | 37.51 | 33.95 | 31.15 |
| | TC2 (C.) | 289.15 | | | 280.71 | | | |
| | (J/g) | 2.69 | | | 1.31 | | | |
| | TC3 (C.) | | | | | | | |
| | (J/g) | | | | | | | |
| TR | TR1 (C.) | 349.34 | 369.6 | 374.35 | 346.01 | 344.86 | 367.87 | 362.14 |
| | (J/g) | −36.7 | −57.71 | −78.97 | −56.15 | −70.52 | −48.84 | −52.87 |
| | TR2 (C.) | | | | | | 437.48 | |
| | (J/g) | | | | | | −10.48 | |
| | TR3 (C.) | | | | | | | |
| | (J/g) | | | | | | | |
| | Bach size | 10 g | 10 g | 10 g | 10 g | 10 g | 10 g | 10 g |
| | Melt pour | Good | Good | Good | Good | Good | Good | Good |

| | mesh | Example 64 100/200 | Example 65 100/200 | Example 66 100/200 | Example 67 100/200 | Example 77 100/200 |
|---|---|---|---|---|---|---|
| (A) | Ag$_2$O: 231.7 g/mol | 63.10 | 61.40 | 61.30 | 60.67 | 66.44 |
| (B) | V$_2$O$_5$: 181.9 g/mol | 28.90 | 28.10 | 28.00 | 27.83 | 25.56 |
| (C) | MoO$_3$: 143.9 g/mol | 7.50 | 10.00 | 10.00 | 7.50 | 7.5 |
| | ZnO: 81.4 g/mol | | | | | |
| | CuO: 79.5 g/mol | | | | | |
| | TiO$_2$: 79.9 g/mol | | | | | |
| | Bi$_2$O$_3$: 466.0 g/mol | | | | | |
| | MnO$_2$: 86.9 g/mol | | | | | |
| | MgO: 102 g/mol | | | | | |
| | Nb$_2$O$_5$: 265.8 g/mol | | | | | |
| | BaO: 153.3 g/mol | | | | | |
| | P$_2$O$_5$: 141.94 g/mol | | | | | |
| (D) | SiO$_2$: 60.1 g/mol | 0.50 | 0.50 | 1.00 | | 0.5 |
| | Al$_2$O$_3$: 102 g/mol | | | | | |
| | SnO: 134.7 g/mol | | | | | |
| | Fe$_2$O$_3$: 159.7 g/mol | | | | | |
| | WO$_3$ 231.8 g/mol | | | | 4.00 | |
| | TeO$_2$ 159.6 g/mol | | | | | |
| | Sb$_2$O$_3$ 291.5 g/mol | | | | | |
| | Total | 100.00 | 100.00 | 100.00 | 100.00 | 100.00 |
| | Ag$_2$O/V$_2$O$_5$ | 2.18 | 2.19 | 2.18 | 2.18 | 2.60 |
| | Melt Temp (C.) | 600 | 600 | 600 | 700 | 600 |
| | Tg(C.) | 144.04 | 150.8 | 156.15 | 156.08 | 138.44 |
| | (mW) | | | | | |
| TC | TC1 − Tg | 29.94 | 29.2 | 24.8 | 30.24 | 46.26 |
| | TC1 (C.) | 173.98 | 180 | 180.95 | 186.32 | 184.7 |
| | (J/g) | 28.74 | 30.64 | 30.7 | 33.46 | 31.29 |
| | TC2 (C.) | | | | 309.73 | 290.43 |
| | (J/g) | | | | 8.04 | 4.36 |
| | TC3 (C.) | | | | | |
| | (J/g) | | | | | |
| TR | TR1 (C.) | 357.04 | 354.39 | 362.51 | 352.56 | 362.1 |
| | (J/g) | −59.78 | −19.24 | −24.04 | −1.93 | −55.06 |
| | TR2 (C.) | | | | 379.7 | |
| | (J/g) | | | | −29.62 | |
| | TR3 (C.) | | | | | |
| | (J/g) | | | | | |
| | Bach size | 10 g | 10 g | 10 g | 10 g | 10 g |
| | Melt pour | Good | Good | Good | Good | Good |

As shown in Table 12, the glass frits of these Examples containing component (D) have a glass transition temperature (Tg) of 200° C. or lower, a crystallization temperature (Tc) of 350° C. or lower, and a crystal-remelting temperature (Tr) of 450° C. or lower. The glass frits of the Examples can be used in die attach materials, electrically conductive pastes, or sealing materials. A die attach material, electrically conductive paste, or sealing material containing the glass frits of the Examples can bond an adherend at relatively low treatment temperatures, i.e., 450° C. or lower. A device that uses a die attach material, electrically conductive paste, or sealing material containing the glass frits of the Examples exhibits high thermal stress resistance and maintains high adhesion when, after being bonded, the device is placed under thermal cycling conditions.

Table 13 shows glass frits essentially consisting of (A) $Ag_2O$, (B) $V_2O_5$, (C-1) $MoO_3$, and (C-2) ZnO but having different mass ratios $(Ag_2O/V_2O_5)$ of component (A) to component (B). The glass frits were produced by a method similar to Example 1 except that the compositions shown in Table 11 were used, and evaluated in a manner similar to Example 1.

around 360° C. In a device that uses a die attach material, electrically conductive paste, or sealing material containing a glass frit having a mass ratio $(Ag_2O/V_2O_5)$ of component (A) to component (B) of greater than 3.3, the glass frit may be melted and may not be able to maintain good adhesion when the device is placed under conditions where it is subjected to thermal cycles at relatively high temperatures.

INDUSTRIAL APPLICABILITY

The present invention is directed to a glass frit having a low melting point and not containing lead (Pb), arsenic (As),

TABLE 13

| | | 1.80 Example 87 | 1.95 Example 94 | 2.18 Example 54 | 2.60 Example 88 | 3.20 Example 89 | 3.50 Example 92 | 3.70 Example 93 |
|---|---|---|---|---|---|---|---|---|
| | $Ag_2O/V_2O_5$ | | | | | | | |
| (A) | (A) $Ag_2O$: 231.7 g/mol | 52.71 | 54.20 | 56.21 | 59.22 | 62.48 | 63.78 | 64.55 |
| (B) | (B) $V_2O_5$: 181.9 g/mol | 29.29 | 27.80 | 25.79 | 22.78 | 19.52 | 18.22 | 17.45 |
| (C) | (C) $MoO_3$: 143.9 g/mol | 10.00 | 10.00 | 10.00 | 10.00 | 10.00 | 10.00 | 10.00 |
| | (C) ZnO: 81.4 g/mol | 8.00 | 8.00 | 8.00 | 8.00 | 8.00 | 8.00 | 8.00 |
| | Total | 100.00 | 100.00 | 100.00 | 100.00 | 100.00 | 100.00 | 100.00 |
| | Melt Temp (C.) | 700 | 700 | 700 | 700 | 700 | 700 | 700 |
| | Dwell at melting temp. (C.) | 15 | 15 | 15 | 15 | 15 | 15 | 15 |
| | Preheat Temp (C.) | 550 | 550 | 550 | 550 | 550 | 550 | 550 |
| | Precrystallize (C.) | — | — | — | — | — | — | — |
| Tg | Tg (C.) | 181.2 | 178.12 | 167.88 | 159.75 | 145.97 | — | — |
| | (mW) | | | | | | | |
| TC | TC1 − Tg | 70.15 | 76.15 | 87.11 | 54.44 | 41.31 | — | — |
| | TC1 (C.) | 251.35 | 254.27 | 254.99 | 214.19 | 187.28 | 172.62 | 191.98 |
| | (J/g) | 56.01 | 52.33 | 51.86 | 43.62 | 12.25 | 1.33 | |
| | TC2 (C.) | | 296.64 | 295.49 | 313.91 | 267.61 | 288.41 | 285.58 |
| | (J/g) | | 0.27 | 0.91 | 7.22 | 3.12 | 11.38 | 10.03 |
| | TC3 (C.) | | | | | 290.06 | | |
| | (J/g) | | | | | 8.74 | | |
| TR | TR1 (C.) | 340.61 | 341.05 | 342.31 | 344.55 | 416.17 | 360.21 | 380.33 |
| | (J/g) | −15.98 | −38.08 | −78.99 | −32.06 | −7.09 | −14.51 | −14.05 |
| | TR2 (C.) | | | | | 460.79 | 416.42 | 416.28 |
| | (J/g) | | | | | −18.47 | −11.04 | −12.76 |
| | TR3 (C.) | | | | | | 461.24 | 460.27 |
| | (J/g) | | | | | | −27.33 | −24.18 |
| | bach size | 10 g | 10 g | 10 g | 10 g | 10 g | 10 g | 10 g |
| | Melt pour | good | good | good | good | good | good | good |

As shown in Table 13, the glass frits of these Examples having a mass ratio $(Ag_2O/V_2O_5)$ of component (A) to component (B) of 1.8 to 3.2 have a glass transition temperature (Tg) of 200° C. or lower, a crystallization temperature (Tc) of 150 to 320° C., and a crystal-remelting temperature (Tr) of 465° C. or lower. The glass frits of the Examples are easily melted at relatively low temperatures (e.g., 465° C. or lower). The glass frits of the Examples can be used in die attach materials, electrically conductive pastes, or sealing materials. A die attach material, electrically conductive paste, or sealing material containing the glass frit of the Examples can enhance adhesion by sufficiently wetting and spreading over the adhesive interface. The glass frits of the Examples recrystallize in low temperature ranges of 465° C. or lower, thereby bringing the state of the crystals closer to a eutectic state. A device that uses a die attach material, electrically conductive paste, or sealing material containing the glass frit of the Examples can exhibit high thermal stress resistance. When the glass frit has a mass ratio $(Ag_2O/V_2O_5)$ of component (A) to component (B) of less than 1.8, the glass frit is not vitrified. Furthermore, when the glass frit has a mass ratio $(Ag_2O/V_2O_5)$ of component (A) to component (B) of greater than 3.2, the crystallization temperature (Tc) will be a relatively low temperature of 200° C. or lower, and the crystal-remelting temperature (Tr) will be a relatively low temperature of tellurium (Te), or antimony (Sb), which are toxic substances. The glass frit of the present invention has, for example, a glass transition temperature (Tg) of 300° C. or lower, a crystallization temperature (Tc) of 400° C. or lower, and a crystal-remelting temperature (Tr) of 500° C. or lower. The glass frit of the present invention is industrially useful since it can be used in die attach materials, sealing materials, electrically conductive pastes for forming electrodes, or the like that can be used in electronic components such as display devices or ceramic packages for housing integrated circuit devices, and that can be also used to bond an adherend that is extremely sensitive to heat.

The invention claimed is:

1. A glass frit which does not contain lead, arsenic, antimony or tellurium, the glass frit comprising (A) $Ag_2O$, (B) $V_2O_5$, and (C) at least two first oxides consisting of a combination of at least two oxides selected from the group consisting of $MoO_3$, ZnO and CuO.

2. The glass frit according to claim 1, wherein component (C) consists of a combination of oxides selected from the group consisting of $MoO_3$ and ZnO; $MoO_3$ and CuO; and ZnO and CuO.

3. The glass frit according to claim 1, wherein component (C) consists of a combination of $MoO_3$, ZnO and CuO.

4. The glass frit according to claim 1, wherein the mass ratio $(Ag_2O/V_2O_5)$ of (A) to (B) is 1.8 to 3.2.

5. The glass frit according to claim 1, wherein (A) is in an amount of 40 to 70% by mass, (B) is in an amount of 10 to 40% by mass, and (C) is in an amount of 0.5 to 30% by mass, with respect to the total mass in terms of oxides.

6. The glass frit according to claim 5, wherein (C) is in an amount of 0.5 to 15% by mass, with respect to the total mass in terms of oxides.

7. The glass frit according to claim 1, further comprising (D) at least one second oxide selected from the group consisting of $SiO_2$, $Al_2O_3$, SnO, $WO_3$ and $Fe_2O_3$.

8. The glass frit according to claim 7, wherein (D) is in an amount of greater than 0 to 15% by mass with respect to the total mass in terms of oxides.

9. A glass frit which does not contain lead, arsenic, antimony or tellurium, the glass frit consisting essentially of (A) $Ag_2O$, (B) $V_2O_5$, and (C) at least one first oxide consisting of $MoO_3$ or a combination of at least two oxides selected from the group consisting of $MoO_3$, ZnO and CuO.

10. The glass frit according to claim 9, wherein (C) consists of two first oxides selected from the group consisting of $MoO_3$, ZnO and CuO.

11. The glass frit according to claim 9, wherein (C) consists of $MoO_3$.

12. The glass frit according to claim 9, wherein (C) consists of $MoO_3$ and ZnO.

13. The glass frit according to claim 12, wherein a mass ratio ($MoO_3$:ZnO) of $MoO_3$ to ZnO in (C) is 12:1 to 1:12.

14. The glass frit according to claim 9, wherein (C) consists of $MoO_3$ and CuO.

15. The glass frit according to claim 14, wherein a mass ratio ($MoO_3$:CuO) of $MoO_3$ to CuO in (C) is 12:1 to 1:10.

16. The glass frit according to claim 9, wherein (C) consists of ZnO and CuO.

17. The glass frit according to claim 16, wherein a mass ratio (ZnO:CuO) of ZnO to CuO in (C) is 12:1 to 1:12.

18. The glass frit according to claim 9, wherein (C) consists of $MoO_3$, ZnO, and CuO.

19. The glass frit according to claim 18, wherein a mass ratio ($MoO_3$:total amount of CuO and ZnO) of $MoO_3$ to the total amount of ZnO and CuO in (C) is 12:1 to 1:12.

20. A glass frit which does not contain lead, arsenic, antimony or tellurium, the glass frit consisting essentially of (A) $Ag_2O$; (B) $V_2O_5$; (C) at least one first oxide consisting of $MoO_3$ or a combination of at least two oxides selected from the group consisting of $MoO_3$, ZnO and CuO; and (D) at least one second oxide selected from the group consisting of $SiO_2$, $Al_2O_3$, SnO, $WO_3$ and $Fe_2O_3$.

21. The glass frit according to claim 18, wherein (C) consists of $MoO_3$.

* * * * *